United States Patent
Mizutani et al.

(10) Patent No.: US 8,249,458 B2
(45) Date of Patent: Aug. 21, 2012

(54) OPTICAL COMMUNICATION SYSTEM AND METHOD FOR OPERATING THE SAME

(75) Inventors: Masahiko Mizutani, Yokohama (JP); Yusuke Yajima, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 373 days.

(21) Appl. No.: 12/638,383

(22) Filed: Dec. 15, 2009

(65) Prior Publication Data
US 2010/0178051 A1 Jul. 15, 2010

(30) Foreign Application Priority Data

Jan. 9, 2009 (JP) ................................. 2009-003036

(51) Int. Cl.
*H04J 14/08* (2006.01)
(52) U.S. Cl. .......................................... 398/100; 398/67
(58) Field of Classification Search .............. 398/66–67, 398/100
See application file for complete search history.

(56) References Cited

U.S. PATENT DOCUMENTS 5,912,998 A * 6/1999 Quayle ........................... 385/24
2009/0208210 A1   8/2009 Trojer et al.

FOREIGN PATENT DOCUMENTS
EP         1 926 238 A1     5/2008
WO    WO 2008/117035 A1   10/2008

OTHER PUBLICATIONS

European Search Report issued in European Patent Application No. EP 09179562.5 dated Apr. 28, 2010.
ITU-T G-Series Recommendations; G.984.3, Feb. 2004; Series G: Transmission Systems and Media, Digital Systems and Networks.
ITU-T Recommendations (proposal); Draft GPON optical reach extension (G.984.re); Geneva, Feb. 11-22, 2008.

* cited by examiner

*Primary Examiner* — Leslie Pascal
(74) *Attorney, Agent, or Firm* — McDermott Will & Emery LLP

(57) ABSTRACT

An optical communication system has a master station and a plurality of slave stations connected thereto via an optical fiber network, which is provided with an optical splitter and a relay unit which relays signals transmitted/received between the master station and the plurality of slave stations. The master station includes a first controller for performing ranging between the master station and the relay unit, and the relay unit includes a second controller for performing ranging between the relay unit and the plurality of slave stations. The master station determines, on the basis of the results of ranging performed by the first and second controllers as well as reports from the slave stations, timings for the slave stations to transmit signals to the master station, and receives signals multiplexed through the optical fiber network from the slave stations.

9 Claims, 14 Drawing Sheets

OPTICAL COMMUNICATION SYSTEM AND METHOD FOR OPERATING THE SAME

INCORPORATION BY REFERENCE

The present application claims priority from Japanese application JP2009-003036 filed on Jan. 9, 2009, the content of which is hereby incorporated by reference into this application.

BACKGROUND OF THE INVENTION

The present invention relates to the configuration of an optical communication system in which a plurality of subscriber units share an optical transmission line and a method for operating the system, and also relates to a system extension such as an extension of the transmission distance and an increase in the number of subscribers to be accommodated.

As the need for the communication utilizing the broadband increases, with respect to the access line dedicated to users, a large-capacity access line using optical fibers has been substituting for the access technique based on the telephone line such as DSL (Digital Subscriber Line). At present, in view of costs for line construction and maintenance management, the PON (Passive Optical Network) system (hereinafter, sometimes simply referred to as PON, an optical passive network system or passive optical network system) has been used frequently and widely as the access network. The ITU-T (International Telecommunication Union Telecommunication Standardization Sector) has been proceeding with standardization (recommendation) of the PON, and then the G-PON (Gigabit capable PON) standardized by the ITU-T recommendation G.984.3, for example, has begun to be introduced to the access network since around 2006 in individual countries in the world.

The PON is a system in which between an office side apparatus (hereinafter referred to as an OLT (Optical Line Terminal) and each of a plurality of subscriber units (hereinafter referred to as ONUs (Optical Network Units), optical signals are branched and/or multiplexed by using optical fibers and an optical splitter so as to be transmitted/received therebetween. Since the performance such as attenuation amounts of the optical signals passing through the optical fibers is limited by the transmission performance of the used optical fiber and the number of optical branching paths in the used optical splitter, the communication distance between OLT and ONU is limited. Taking a specified example, a GPON is used for which the communication distance is a maximum of 20 km and the number of branching paths (the number of ONUs connectable to the OLT) of the optical splitter is set to a maximum of 64.

As the opportunity of accessing the Internet and making communication by the home subscribers (communication network users) in order to collect information and keep social life increases, equipments of communication network, especially, access networks for connecting the subscribers to the communication network have been demanded to be increased. In other words, the carrier offering the communication network is urged to increase the capital necessary for increasing the number of subscribers accommodated by each station as the number of users of the access line increases. In order to increase the number of users, a method is conceivable which additionally introduces the PON per se used in the access network, that is, adds the OLT, or extends the number of ONUs which the OLT of PON accommodates. In the generally accepted configuration of the PON, however, the OLT totally carries out the control of a complicated system such as bandwidth control and the management of all of the ONUs accommodated and is far more expensive than the ONU. The costs for newly constructing optical fibers also incur a great expense imposed on the carrier. Accordingly, as the method for solving, increasing the number of ONUs accommodated per OLT is preferable to adding OLTs.

In connection with the existing PON, the study of a relay unit used for communication distance extension and increasing the number of branching optical paths (hereinafter referred to as an EB (Extender Box)) has been starting. In basic concept thereof, the EB is installed appropriately inside an optical signal communication section between the OLT and the ONU, and is controlled by the OLT to realize extending the communication distance of the optical fiber and increasing the number of optical branching path. Then, for the control protocol, standardization by the ITU-T proceeds at present which is based on a proposal purporting that the OMCI (ONU Management Control Interface) representing the existing ONU control protocol is used. This makes it possible to offer high-speed Internet access service to a region for which spread of IT technology is more behind the times than for the urban central region, and is noticed as one of methods for spreading the access network (ITU-T recommendation (proposal) G. 984, re).

SUMMARY OF THE INVENTION

In introducing the EB into the PON, there a method for inserting an EB in a trunk fiber between the OLT and an optical splitter (also referred to as trunk optical fiber) shared by individual ONUs, and another method for inserting an EB in a branching optical fiber used between the optical splitter and each ONU.

By inserting the EB into the trunk optical fiber, the communication distance can be more extended than that in the conventional PON, and so an ONU of a subscriber at a remote location can be accommodated in the same OLT, and the number of ONUs accommodated by the OLT can be increased easily. Namely, the ONU accommodation efficiency of the OLT can be improved. On the other hand, as the communication distance increases, the time of communicating with the ONU at a remote location (transmission delay time) increases, and the number of the ONUs also increases, so that at the OLT, not only the signal waiting time but also the signal processing load increases. For these reasons, there is the possibility that the communication time assigned to each ONU will decrease. Specifically, when performing the ranging for measuring the communication distance (transmission delay time) between the OLT of PON and an arbitrary ONU (in many cases, a new ONU additionally connected to the OLT), because of the fact that the OLT waits for a response to the ranging from the ONU, all of the ONUs which have already been connected for operating must interrupt the communication, and by inserting the EB, an expected waiting time increases, followed by an increase in communication interruption time of each ONU. In other words, the increase of the communication interruption time at the ONU in operation has an influence upon the quality of the signal required of the real time property and makes complicated the process for assigning communication capacity (bandwidth) to each ONU based on the DBA (Dynamic Bandwidth Assignment) to all ONUs, decreases the bandwidth assignment, and increases the waiting time for the signal transmission.

Accordingly, even if an EB is introduced into the PON to extend the communication distance between an OLT and an ONU and to increase the number of accommodated ONUs, there is a demand for providing a PON which can suppress generation of the aforementioned problem that in the OLT, the signal process load increases, that in each ONU, the signal transmission waiting time increases, the transmission signal bandwidth decreases or the quality of transmission signal is degraded, and preferably which has the same communication quality as that of the conventional PON. Specifically, an object of the present invention is to provide a PON which can suppress generation of the aforementioned problem even if the ranging necessary for the PON is performed, a method for controlling the PON and a method for ranging.

Meanwhile, even in the method of inserting the EB into the branching optical fiber, the same problem takes place in connection with an ONU communicating via the EB. However, by the feature that the EB does not have an influence upon another ONU, wherein the conventional PON control method (ranging) can be used. Accordingly, in connection with a PON where an ONU connected via the EB and another ONU not connected via the EB coexist, the purpose of the present invention is to provide a PON configured to control the PON by using the conventional method in the case where the ONU is not connected via the EB or the method in the case where the ONU is connected via the EB depending on the installation of the EB inside the PON, a method for controlling the PON and a method for ranging.

To solve the above problems, an optical communication system (PON) according to the present invention comprises a relay unit also having the ranging function, and is configured to perform the ranging through two separated procedures.

Namely, the present invention is an optical communication system having a master station connected to a plurality of slave stations via an optical fiber network provided with an optical splitter, comprising:

a relay unit for relaying in said optical fiber network signals transmitted and received between said master station and said plurality of slave stations;

said master station including a first controller for measuring a transmission distance or a transmission time between said master station and said relay unit;

said relay unit including a second controller for measuring a transmission distance or a transmission time between said relay unit and said plurality of slave stations;

wherein said master station determines, on the basis of a result of the first measurement performed by said first controller and a result of the second measurement performed by said second controller of said relay unit as well as reports from said plurality of slave stations, timings for the individual slave stations to respectively transmit signals to said master station, and receives the signals from said plurality of salve stations multiplexed through said optical fiber network.

Specifically, said relay unit is inserted in a first optical fiber between said master station and said optical splitter, and firstly, said first controller of said master station performs said first ranging, and instructs said relay unit to perform said second ranging in accordance with states of connection to said plurality of slave stations via said optical fiber network.

According to the present invention, even if the relay unit is introduced into the optical communication system (PON) to extend the communication distance between the master station and the slave station and to increase the number of the slave stations to be accommodated, the ranging process is separated into two process, and in operation, only one of the two ranging process is performed, and the interruption time of signals from the slave station due to ranging depends on only the maximum distance from the relay unit to the slave station, whereby an increase in signal interruption time accompanying the distance extension can be suppressed. Accordingly, the present invention can suppress the phenomenon such as an increase in the signal processing load in the master station, and an increase in the signal transmission waiting time, an increase in signal transmission waiting time/a decrease in transmission signal bandwidth or a degradation in the quality of the transmission signal on the slave station side.

Other objects, features and advantages of the invention will become apparent from the following description of the embodiments of the invention taken in conjunction with the accompanying drawings.

DETAILED DESCRIPTION OF THE EMBODIMENTS OF THE INVENTION

Hereinafter, configuration and action of a PON according to the present invention will be described with reference to the accompanying drawings as an example of configuration and action of a G-PON stipulated by the ITU-T recommendation G. 984.3.

Figure 1:
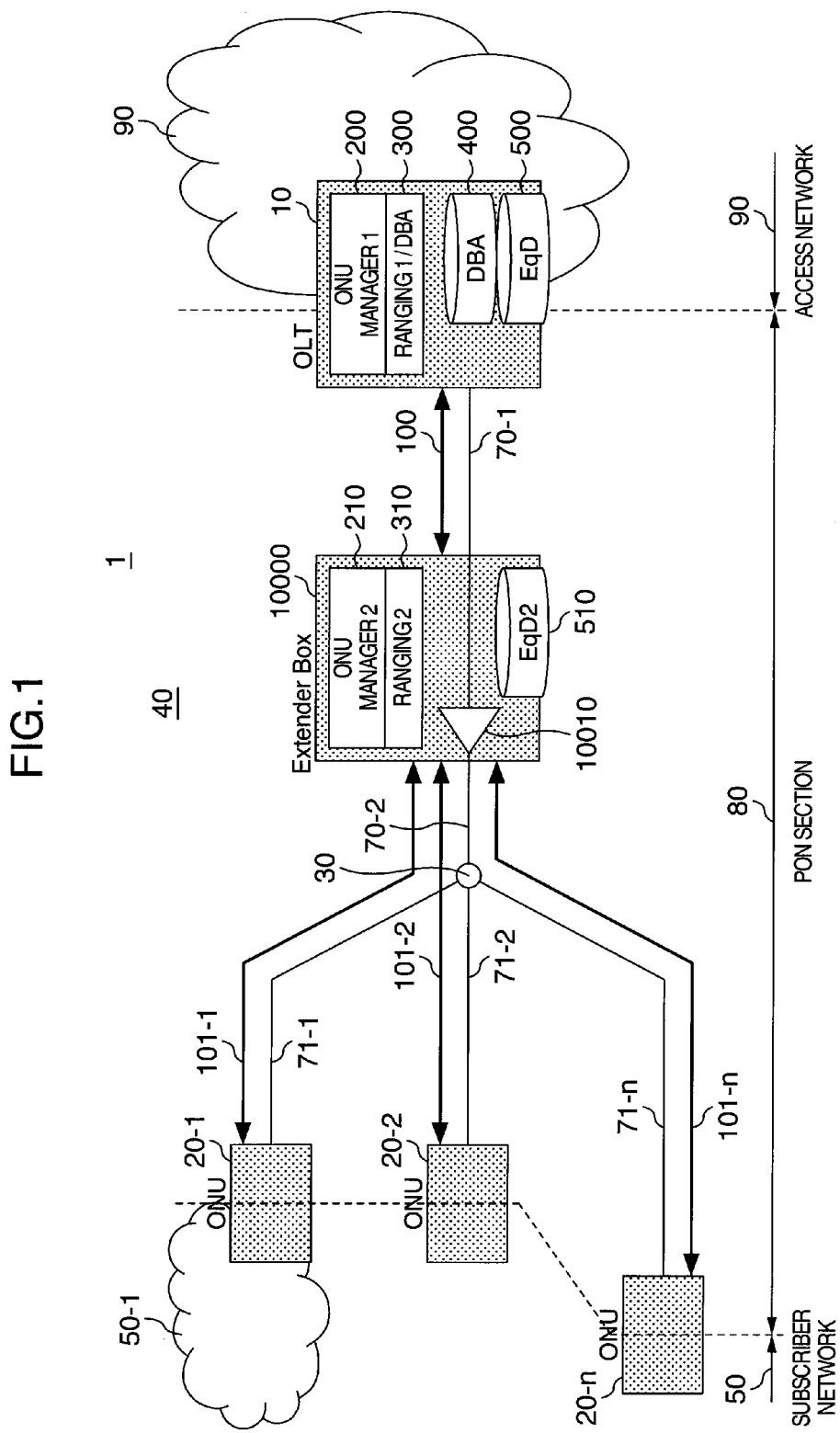
FIG. 1 is a diagram illustrating a configuration example of an optical access network using a PON.

FIG. 1 is a diagram illustrating a configuration example of an optical access network using a PON according to the present invention, where an EB is inserted in a trunk optical fiber of the PON.

In a PON 40 having an office side unit (OLT) 10, a plurality of subscriber units (ONUs) 20-1 to 20-n, an optical splitter 30, a trunk optical fiber 70, a plurality of branching optical fibers 71-1 to 71-n and a signal relay unit (EB) 10000 inserted between sections 70-1 and 70-2 on the way of the trunk optical fiber 70, an optical access network 1 is a network for connecting the individual ONUs 20 (20-1 to 20-n) to subscriber networks 50 (or terminals such as PCs or telephones, as a typical example of which only a subscriber network 50-1 is shown in the figure), and connecting the OLT 10 to an access network 90 which is an upper communication network. In the following description, an interval between the OLT 10 connected to the access network and the ONU 20 connected to the subscriber network 50 is referred to as a PON section 80. The OLT 10 is a communication unit having interfaces with the PON section 80 and the access network 90, respectively, and transmits/receives information signals by transmitting/receiving information to/from a further upper communication network via the access network 90 and transferring the information to the ONU 20. The access network 90 often uses a packet communication network comprised of an IP router and an Ethernet (registered trade mark) switch or the like, but it may use other types of communication network. In general form, the ONU 20 is installed at a site in a home or of an enterprise of users, and is connected to the subscriber network 50 in the form of a LAN or equivalent network. To each subscriber network 50, a telephone terminal offering IP call or existing telephone service or an information terminal such as a PC/cellular terminal is connected. In the PON section 80, communication based on an optical signal is carried out between the OLT 10 and each of the ONUs 20-1 to 20-n. It is to be understood that the wavelength of an optical signal used in the PON has different wavelengths λup for upstream and λdown for downstream to prevent signals from interfering with one another in the optical fibers 70 and 71 and the splitter 30.

Meanwhile, the ONU manager 1 200, ranging 1/DBA 300 and DBA 400 of the OLT 10 will be explained later as the ONU manager 1060, ranging 1/DBA processor 1070 and DBA information DB 1071 of the OLT 10 in connection with FIG. 2, and then the ranging 1/DBA 300 and DBA 400 determines, responsive to the request for bandwidth from the ONUs 20, assignment of communication bandwidths of upstream signals to the ONUs 20. Further, the ONU manager 2 210 and ranging 2 controller 310 of the EB 10000 will be explained later as the ONU manager 11061 and ranging controller 11050 in connection with FIG. 4

Downstream signals transmitted from the OLT 10 pass through the EB 10000, and branch at the splitter 30, arriving at all of the ONUs 20-1 to 20-n constituting the optical access network 1. Taking a G-PON for example, downstream signals from the OLT 10 are transmitted by using frames used for the communication inside the PON section 80 (hereinafter referred to as GEM frames). Each of the GEM frames is structured to include a header and a payload and into the header, an identifier (Port-ID) of an ONU 20 indicating a destination of each GEM is inserted. Each of the ONUs 20-1 to 20-n extracts the header of a particular GEM frame and when a destination Port-ID of the particular frame designates itself, carries out the frame process but when the Port-ID designates a frame destined for a different ONU 20, the frame is discarded.

For all upstream communication from each of the ONUs 20-1 to 20-n to the OLT 10, optical signals having the same wavelength λup are used. The upstream signal is a variable-length frame (hereinafter referred to as GEM frame) and is structured to include, like the downstream signal, a header and payload for each ONU. The individual ONUs 20 transmit upstream signals at transmission timings different from one another so that GEM packets from the individual ONUs 20 can be identified discriminatively from one another by the OLT 10 and that the individual upstream signals do not collide/interfere with one another on the trunk optical fiber 70. These signals are time-division multiplexed on the trunk optical fiber 70 and reach the OLT 10. Specifically, (1) by means of ranging, the distance from the OLT 10 to each of the ONUs 20-1 to 20-n is measured, and the amount of delay of the signal is adjusted, and (2) by means of DBA, the OLT 10 causes the individual ONUs 20-1 to 20-n to report amounts of data waiting for transmission and then, on the basis of the reports, instructs upstream signal transmission timings and amounts of transmissible data of the individual ONUs 20-1 to 20-n. (3) When the individual ONUs 20 transmit pieces of data at the timings instructed by the OLT 10, these signals are time-division multiplexed on the trunk optical fiber 70 and reach the OLT 10. (4) Since the OLT 10 knows the timings designated to the individual ONUs 20, it identifies signals of the individual ONUs 20 from the multiplexed signal and performs a reception process.

The EB 10000 includes an optical relay functional section 10010 for relaying an optical signal transmitted from the OLT 10 to the ONU 20 and an optical signal transmitted from the ONU 20 to the OLT 10. The optical relay functional section 10010 includes a configuration to directly amplify a signal received with an optical amplifier so as to transmit an amplified signal, and a configuration to once convert a received optical signal to an electrical signal so as to confirm the signal contents, execute a necessary process including termination and frame insertion and thereafter convert the resulting signal to an optical signal and then transmit it. Generally, the two configurations are used appropriately in accordance with the nature of the signal to be transmitted/received. In the EB 10000 used for the PON 40 of the present invention to be described later, a signal process (control process) for performing part of the ranging function the conventional OLT has is needed, and therefore the received optical signal (control signal) is once converted into an electrical signal which in turn is processed (relayed).

In the PON 40 of the present invention, the EB 10000 executes part of conventional ranging performed by the OLT 10. This aims at preventing the control signal processing time in the PON section 80 extended by the EB 10000 from increasing as described previously. Specifically, in the PON 40 of the present invention, the ranging (distance measurement) is first performed in a section 100 between the OLT 10 and the EB 10000, and then the ranging is performed in sections 101-1 to 101-n between the EB 10000 and the individual ONUs 20, as shown in FIG. 1. Results of the ranging in the individual sections are stored in ranging data bases 500 and 510 of the OLT 10 and EB 10000, respectively, and used for the subsequent processes of the PON 40 such as the DBA.

Although being described later in greater detail with reference to FIG. 5, the ranging is performed in such a manner that at the start-up of the PON 40, the OLT 10 first measures a round trip delay (RTD) with respect to the EB 10000 by means of the first ranging, and determines a value of equivalent delay (EqD) on the basis of a measurement result. This calculated EqD will be referred to as EqD1 hereinafter. The EqD1 is stored in the EqD information database (hereinafter DB will be short for database) 500 of OLT 10. For the first ranging, a ranging method stipulated by the ITU-T recommendation G.984.3 may be used. The value of the EqD1 is substantially constant if there is no variation in characteristics of the trunk optical fiber 70-1 and is in common to each of the ONUs 20, and therefore, it may be measured only once initially. Namely, if the distance from the OLT 10 to EB 10000 is measured initially, it is unnecessary to subsequently perform the ranging from OLT 10 to each of the ONUs 20, and thus the aforementioned increasing of the time to interrupt communication of all ONUs in order for the OLT to wait for a response to the ranging from the ONU as the PON section 80 extends can be eliminated.

With the first ranging finished, the EB 10000 measures RTDs between the EB 10000 and the individual ONUs 20-1 to 20-n by means of the second ranging. From the RTDs, the EB 10000 calculates values of equivalent delay EqD2 to be set to the individual ONUs 20-1 to 20-n, and stores the determined values of the EqD2 in the EqD2 information DB 510.

Like the EqD of the existing PON, values of the EqD2 is set so as to make the response time of the individual ONUs 20 to the EB 10000 identical inside the system. The sum of the EqD2 and the previously determined EqD1 is an EqD to be set in the OLT 10 and in each of the ONUs. For the second ranging performed by the EB 10000, the ranging method stipulated by the ITU-T recommendation G.984.3 may be also used. Namely, in connection with the ranging, the EB 10000 acts in behalf of the OLT 10. It depends on the installation position of the EB 10000, but even if it is configured to perform the second ranging from the EB 10000 to the individual ONUs 20, the total length of the trunk optical fiber 70-2 and each of the branching optical fibers 71 is set to within 20 km, and the distance of the PON section 80 is extended to more than 20 km by introducing the EB 10000 and extending the trunk optical fiber 70-1, only the second ranging identical to that in the conventional PON may be performed in operation of the PON 40, thereby eliminating the aforementioned increasing of the time to interrupt communication of all ONUs because of the fact that the OLT waits for a response to the ranging from the ONU as the PON section 80 extends.

In the EqD information DB 500 of OLT 10, the EqD1 information, EqD2 information and RTD of the PON section 80 are held to ensure that when the OLT 10 assigns bandwidths to the individual ONUs 20, upstream signals from individual corresponding ONUs 20 can be received correctly.

Figure 2:
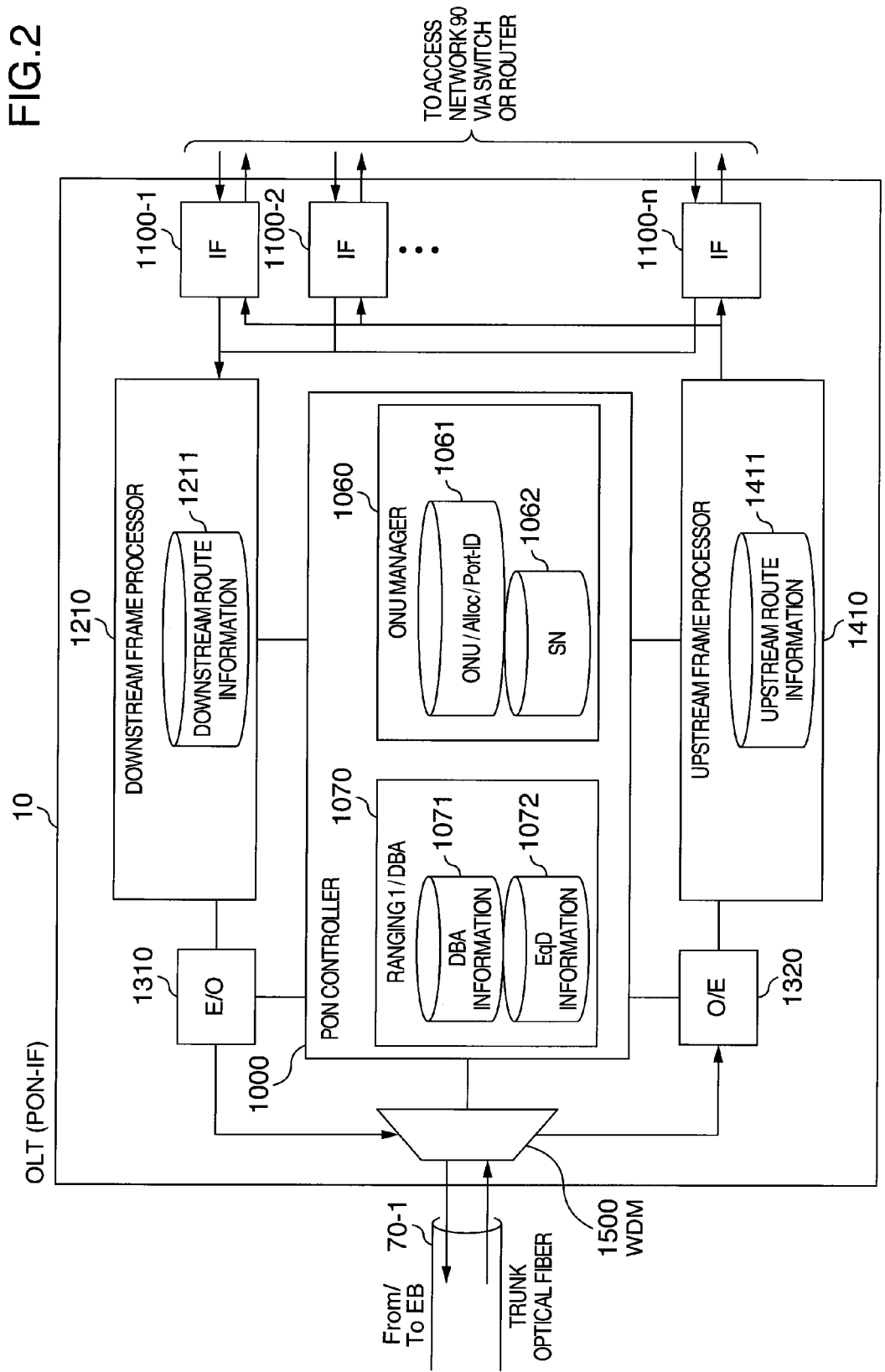
FIG. 2 is a block diagram illustrating a configuration example of an OLT.

FIG. 2 is a block diagram illustrating a configuration example of an OLT of the PON.

Downstream signals from the access network 90 are inputted to SNIs (Service Network Interfaces), IFs 1100-1 to 1100-n. A packet network is often used as the access network 90 and an Ethernet interface of 10/100 Mbps or 1 Gbps is often used as the IF, but the present invention is not limited thereto. The received signal (hereinafter, the signal is sometimes referred to as data or packet) is transferred to a downstream frame processor 1210 in which header information of the packet is analyzed. Specifically, on the basis of flow identification information contained in the header of the packet and including destination information, transmission originator information and route information, an ONU 20 to which the received packet is to be transferred is determined. Along with the determination of the destination information, conversion or assignment of the header information of the received packet is carried out as necessary. The downstream frame processor 1210 has a downstream route information DB 1211 for determining a process such as destination determination, or conversion or assignment of header information, and by consulting the DB 1211 when triggered by one or plurality of parameters contained as the herder information of the received packet, the above process can be conducted.

The downstream frame processor 1210 is also provided with a frame generation function to change the received packet to a frame format for transmission on the PON section 80 in accordance with the contents of header process determined inside the downstream frame processor 1210. As an example, a specified process for transmitting the received Ethernet packet via the PON section 80 of GPON is carried out as follows:

(1) header information of the Ethernet packet is extracted;

(2) when triggered by the header information, the downstream route information DB 1211 is retrieved inside downstream frame processor 1210, a VLAN tag process (conversion, deletion, transmission, assignment), and its transfer destination are determined in respect of the received packet;

(3) through the frame generation function, a GEM header including a Port-ID set in a particular transfer destination ONU is generated; and (4) the GEM header is assigned to the received packet, and the Ethernet packet is encapsulated as a GEM frame.

The GEM frame, that is, the encapsulated Ethernet packet is read out of the downstream frame processor 1210, subjected to conversion from electrical signal to optical signal in an E/O processor 1310 and transmitted to the ONU 20 via a wavelength-division multiplexer/demultiplxer (WDM) 1500 and the trunk optical fiber 70-1.

In the PON section, each ONU 20 transmits an upstream signal at a timing designated by the OLT 10. The upstream signal is a burst-like signal transmitted intermittently by the individual ONUs 20, and upstream signals from the individual ONUs are time-division multiplexed on the trunk optical fiber 70, and received by the OLT 10 via the EB 10000. An optical signal received via the trunk optical fiber 70-1 and the WDM 1500 is synchronized in bit and in frame (the frame termination process of PON section 80 or 100) on the basis of a preamble attached to the heading of each received burst signal and a pattern called delimiter. These processes are conducted in an O/E processor 1320 for converting an optical signal to an electrical signal.

After upstream signal is terminated at the O/E processor 1320, it is transferred to an upstream frame processor 1410 in which it is processed in process procedures substantially inverse to those for the downstream signal described previously. Specifically, the GEM frame is terminated at the upstream frame processor 1410, and converted to an Ethernet packet. The upstream frame processor 1410 has also an upstream route information DB 1411, and as in the case of the downstream signal, consults the DB for analysis and conversion of the header information, and determines a destination of transfer of the packet. Further, like the downstream frame processor 1210, the upstream frame processor 1410 has a frame generation function to change the frame format of the received packet to that of a packet transmitted/received by the upper access network 90. Its example is the function to convert, in contrast to the case of the downstream signal, the GEM frame transmitting via the PON section 80 into an Ethernet packet. The Ethernet packet is read out of the upstream frame processor 1410 and transmitted to the access network 90 having an L2 switch and a router via the IFs 1100-1 to 1100-n.

A PON controller 1000 of the OLT 10 of the present invention is configured to control the whole of the PON 40 including the EB 10000 such as setting/management of the individual ONUs 20, and includes a ranging 1/DBA processor 1070 and an ONU manager 1060.

The ranging 1/DBA processor 1070 has the function to measure an RTD between the OLT 10 and EB 10000 by means of a first ranging to determine an EqD1 and store it. It also stores an EqD2 obtained by means of a second ranging between the EB 10000 and each of the ONUs 20. A value of the sum of the EqD1 and EqD2 is information corresponding to a transmission distance (delay time) from the OLT 10 to each ONU 20, and stored in an EqD information DB 1072 so as to be used for DBA processing in operation of the PON. A DBA information DB 1071 is also a database for storing information necessary for the DBA processing, and stores the amount of data (bandwidth) and a transmission timing (position information and time/timing on the frame) by which each ONU 20 is permitted to transmit an upstream signal.

When confirming the heading position of the received signal in the synchronization process of the upstream signal, the PON controller 1000 of the OLT 10 compares the heading position of the received signal with a reception schedule position (schedule time) by consulting the DBA information DB 1071 inside the ranging 1/DBA processor 1070. If the heading position of the received signal shifts from a reception schedule position (schedule time) of the upstream signal managed on the side of OLT 10, the PON controller 1000 determines an EqD correction value, and informs via the downstream frame processor 1210 the ONU 20 of a change in the EqD setting. Meanwhile, as described previously, the EqD information of each ONU 20 subordinate to the OLT 10 is held in the EqD information DB 1072 inside PON controller 1000 by way of the EB 10000. Accordingly, in the process for correcting the EqD of the ONU 20, update of the EqD2 information DB of EB 10000 is also requested.

The ONU manager 1060 has the function to manage/control the ONUs 20-1 to 20-n and the EB 10000 connected subordinately to the OLT 10, on the basis of the signal reception condition from each ONU 20 and EB 10000 and header information contained in a received frame. Specifically, the following control parameters are stored in each database DB. In the present embodiment, serial numbers (SNs) assigned to the individual ONUs in advance are stored in an SNDB 1062, and an ONU/Alloc/Port-ID DB 1061 is configured to store ONU-ID, Alloc-ID and Port-ID which the OLT 10 has assigned to each ONU 20. These parameters give of course an example, and alternatively, other parameters necessary for control of the PON may be stored, or the DBs may be merged into one or divided into 3 or more.

Figure 3:
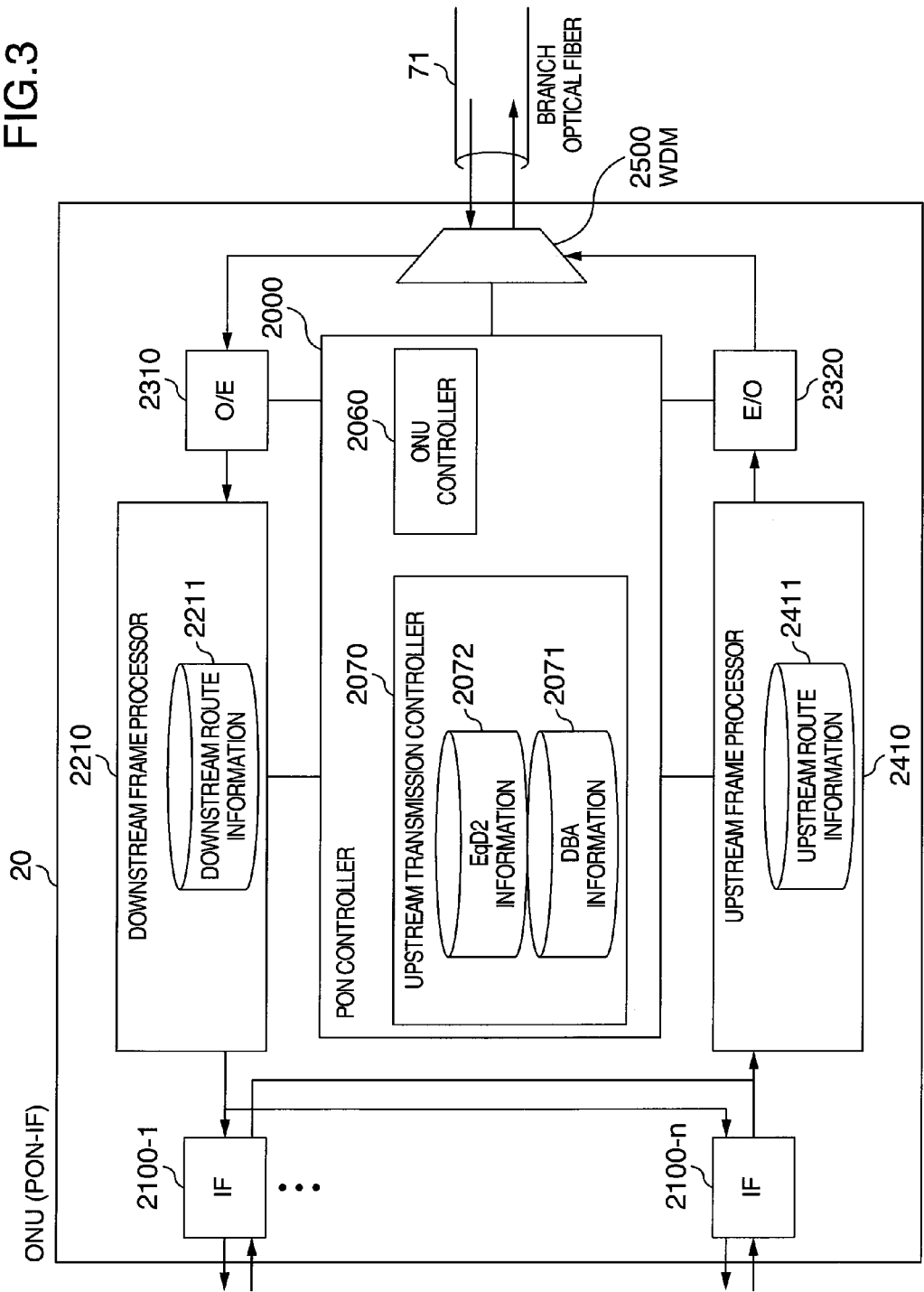
FIG. 3 is a block diagram illustrating a configuration example of an ONU.

FIG. 3 is a block diagram illustrating a configuration example of an ONU of the PON.

An upstream signal from a terminal (not shown) accommodated by the ONU 20 to the PON is inputted via the subscriber network 50 to an UNI (User Network Interface), IFs 2100-1 to 2100-n. It will be appreciated that the LAN or the packet network is often used also for the subscriber network 50, and an Ethernet interface of 10/100 Mbps or 1 Gbps is often used for the IF, but the present invention is not limited thereto.

The configuration and action for processing the downstream signal and upstream signal in the ONU 20 are substantially the same as those in the OLT 10 explained in connection with FIG. 2. Namely, with respect to the downstream signal, a GEM frame which a downstream frame processor 2210 having a downstream route information DB 2211 receives via the PON section 80 is converted into an Ethernet packet and outputted to the terminal of ONU 20, and with respect to the upstream signal, the Ethernet packet which an upstream frame processor 2410 having an upstream route information DB 2411 receives from the terminal is converted into a GEM frame and outputted to the OLT 10.

Meanwhile, O/E processor 2310, E/O processor 2320 and wavelength-division multiplexer/demultiplxer (WDM) 2500 in the ONU 20 are substantially the same as O/E processor 1320, E/O processor 1310 and wavelength-division multiplexer/demultiplxer (WDM) 1500 in the OLT 10 explained in connection with FIG. 2

A PON controller 2000 has an upstream transmission controller 2070 and an ONU controller 2060.

The upstream transmission controller 2070 has an EqD2 information DB 2072 for storing a value of EqD2 informed from the EB 10000 on the basis of the second ranging and a DBA information DB 2071 for storing the result of the DBA (signal transmission start position/time/timing, transmission amount and so on) executed by the OLT 10. The upstream frame processor 2410 consults values stored in these databases as reference information. When information is transmitted at a correct timing (timing at which the signal is time-division multiplexed such that the signal does not overlap with another OUN 20 at the OLT 10) in accordance with an upstream communication transmission command forwarded from the OLT 10 or EB 10000, and thereafter, the upstream signal is transmitted from the frame processor 2410 to the OLT 10.

The ONU controller 2060 is a functional block used for performing parameter setting and communication state management at the start-up of the ONU 20 in accordance with a command from the OLT 10 or EB 10000, and for example, this block has processes such as for analysis of received frame, management of apparatus maintenance management information and decision as to whether communication (response) to the OLT 10 or EB 10000 is necessary or not.

Figure 4:
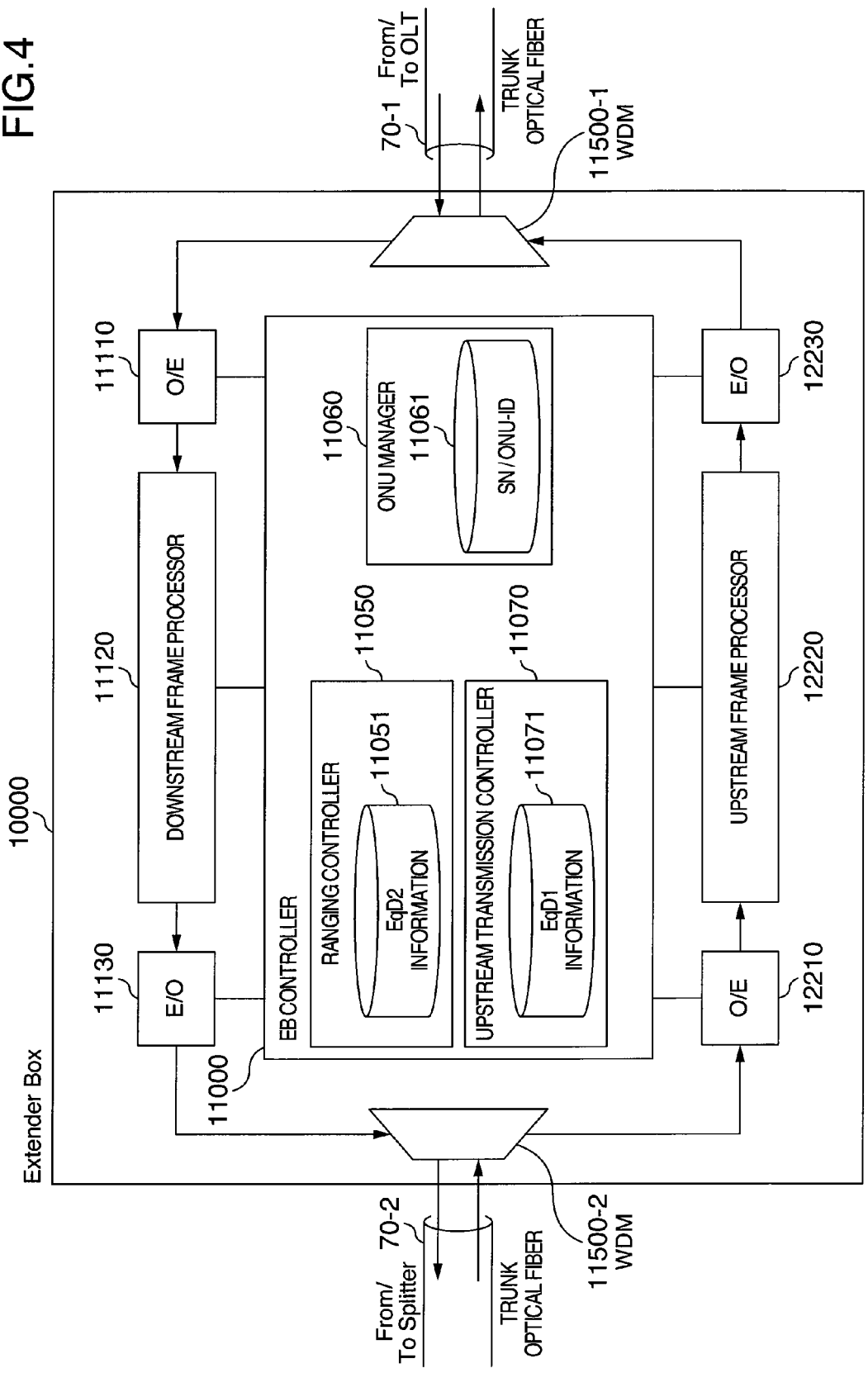
FIG. 4 is a block diagram illustrating a configuration example of an EB in the present invention.

FIG. 4 is a block diagram illustrating a configuration example of an EB of the PON in the present invention.

In the present embodiment, the EB 10000 is inserted in the trunk optical fiber 70 of the PON section 80. Namely, by connecting the OLT 10 and the EB 10000 via the trunk optical fiber 70-1, and by connecting the EB 10000 and the splitter 30 via the trunk optical fiber 70-2, the EB 10000 is configured to maintain the performance as the PON even if the trunk optical fiber 70-1 is extended to accommodate the ONU 20 positioned at a remote location from the OLT 10, too.

The EB 10000 includes an O/E processor 11110 for downstream signal reception and an E/O processor 11130 for downstream signal transmission. It also includes an O/E processor 12210 for upstream signal reception and an E/O processor 12230 for transmission. Where a downstream signal and an upstream signal are received through WDM 11500-1 and WDM 11500-2, respectively, they are synchronized in frame to be terminated as in the OLT 10 and ONU 20. Here, since the optical signal is once converted into an electrical signal, the header of the received frame can be processed and frame information can be confirmed in downstream frame processor 11120, upstream frame processor 12220 and EB controller 11000. Further, as in the OLT 10 and ONU 20, the information generated in the EB controller 11000 is used as a frame which in turn is transmitted to the OLT 10 and ONU 20 via the downstream frame processor 11120 or upstream frame processor 12220. An example of the information transmitted from the EB 10000 is a message for requesting a response to ranging transmitted in order for the EB 10000 to perform the ranging in respect of a newly connected ONU 20. On the other hand, an example of information terminated at the EB 10000 is a response message issued from the ONU 20 in response to the request for a response to ranging.

The EB controller 11000 has a ranging controller 11050, an ONU manager 11060 and an upstream transmission controller 11070.

The ranging controller 11050 is a portion for performing the second ranging in sections 101-1 to 101-n between the EB 10000 and the respective ONUs 20, and has an EqD2 information DB 11051 for storing RTDs for the individual ONUs 20 and EqD2 s obtained from the RTDs. Further, if the head position of the signal received by the OLT 10 shifts from the reception schedule position (schedule time), the ONU 20 is informed of a change in EqD2 setting as described previously, and accordingly, the ranging controller 11050 has the function to change the EqD2 information of the ONU 20 on the basis of the report. Specifically, when the downstream frame processor 11120 receives an EqD2 correction command from the OLT 10, the command is transferred to the ONU 20 via the E/O processor 11130, whereas the ranging controller 11050 updates the contents of the EqD2 information DB in respect of the ONU on the basis of the EqD2 change information of the command. If the shift detected in the OLT 10 is within a predetermined value, the OLT 10 instructs the ONU 20 and (EB 10000) to correct the EqD2 DB, but if it exceeds the predetermined value, the OLT 10 instructs the EB 10000 the ranging process for the ONU 20 again.

The ONU manager 11060 holds ONU identification information necessary for the ranging controller 11050 to grasp an ONU 20 for which the distance is to be measured. Specifically, it holds an SN/ONU-ID information DB 11061 which makes the correspondence between SN information which an ONU 20 to be connected has and ONU-ID information assigned to the ONU 20 by means of the OLT 10.

The upstream transmission controller 11070 has an EqD1 information DB 11071 for holding EqD1 information notified by the OLT 10.

Important action of the EB 10000 is to transmit an upstream signal received from the side of trunk optical fiber 70-2 to the side of OLT 10 at a constant delay in apparatus via the trunk optical fiber 70-1. For example, when the OLT 10 transmits a control message for requesting the EB 10000 to respond, the EqD1 information DB 11071 is used by the EB 10000 per se to consult a standard response time (waiting time in apparatus) to the OLT 10. The O/E processor 12210 always carries out signal synchronization and frame take-in.

Figure 5:
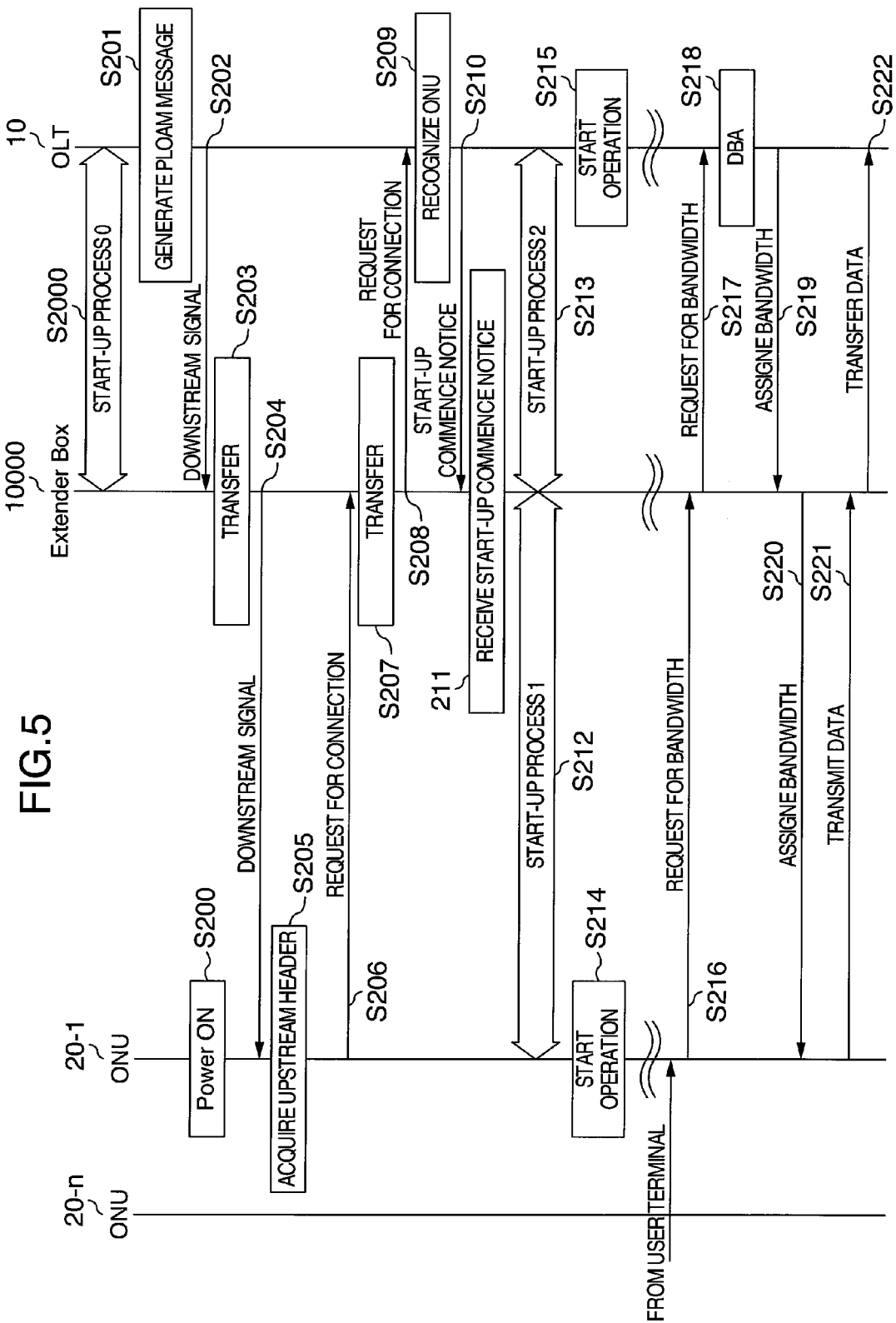
FIG. 5 is an action sequence diagram illustrating an action example of the PON in the present invention.

FIG. 5 is an action sequence diagram illustrating an action example of the PON in the present invention, and demonstrating an example of a process effected at the start-up of an ONU 20 via the EB 10000 by the OLT 10 and of action processes in normal operation state after the start-up.

At the start-up of the EB 10000, distance measurement (RTD measurement) between OLT 10 and EB 10000 is performed by means of the first ranging (FIG. 5: start-up process 0 (S2000)). This process may be carried out pursuant to the ranging procedure stipulated in the ITU-T recommendation G.984.3. An equivalent delay amount obtained from RTD is stored as the EqD1 in the EqD information DB 1072 of ranging 1/DBA controller 1070 in the OLT 10.

When the distance measurement between the OLT 10 and the EB 10000 ends and communication therebetween becomes possible, start-up processes of the ONU 20-1 to ONU 20-n are commenced as follows on the basis of an ONU start up method pursuant to the ITU-T recommendation G.984.3.

The OLT 10, in order to find out an ONU 20 newly connected to the OLT 10, generates PLOAM messages and transmits these messages to the ONU 20 (S202) at appropriate time intervals (S201) until the accommodation number of ONUs 20 reaches the maximum. This down PLOAM message contains header information (specified pattern) which the OUN 20 uses when increasing the message and transmitting through an upstream signal a message requesting connection to the OLT 10. Specifically, the PLOAM message is inserted in the header part of G-PON downstream signal and transmitted (see FIG. 8). Since the downstream signal from the OLT 10 is a control frame destined for the ONU 20, the EB 10000 applies a transfer process to this PLOAM message (S203) and transmits it to each ONU 20 (S204). Specifically, the message is broadcast to all ONUs, and an ONU necessitating the signal applies the reception process to the signal.

When turning on power (S200), the ONU 20-1 newly connected to the OLT 10 starts receiving a downstream signal transmitted from the OLT 10 via the EB 10000 (S204). When the O/E processor 2310 of the ONU 20-1 completes synchronization of the optical signal, the downstream frame processor 2210 detects the contents of the frame. The ONU 20-1 extracts from the header information contained in the downstream signal S204 header information (specified pattern) to be used when transmitting a message for requesting connection to the OLT 10 (S205), and transmits the connection request message to the OLT 10 (S206). Since the upstream signal from the ONU 20 is the control frame destined for the OLT 10, the EB 10000 applies a transfer process to the connection request message (S207) and transmits it to the OLT 10 (S208).

Even if the ONU start-up method stipulated by the ITU-T recommendation G.984.3 is used, the EB 10000 only transfers the control signal transmitted/received between the OLT 10 and the ONU 20. In other words, as viewed from the ONU 20, the OLT 10 merely appears to be at the position of the EB 10000, and the same performance can be maintained through the same control as that for the existing PON. As described later, messages from the OLT 10 and ONU 20 for controlling management of the EB 10000 also exist, and therefore, the EB 10000 has the function to identify whether the signal is one to be transferred between OLT 10 and ONU 20 or one to be processed by the EB per se, and the EB 10000 receiving these signals is configured to perform separate necessary processes and to make a response. For the identification, header of the signal transmitted/received via the PON section and a signal (signal insertion area) referred to as the PLOAM and stipulated in the recommendation may be used.

If the ONU controller 1060 receives an upstream signal from the new ONU 20 which contains the specified signal pattern designated by the down PLOAM message, the OLT 10 recognizes that one ONU 20 is newly connected correctly (S209) and commences the start-up of the ONU 20-1 concerned. Specifically, in order to instruct the EB 10000 to commence the start-up process of the ONU 20-1, the start-up commence notice message is transmitted to the EB 10000 (S210). This message is generated in the frame generator 1220 in accordance with the instruction by the ONU controller 1060, and transmitted to the EB 10000.

When receiving the start-up commence notice S210 from the OLT 10 (S211), the EB 10000 acts, as below, like the OLT 10 stipulated by the ITU-T recommendation G.984.3 to commence the start-up process of the ONU 20-1.

In start-up process 1 (S212 to be detailed later), distance measurement (RTD measurement) to the ONU 20-1 is performed by means of the ranging (second ranging), and the standard time (logical distance) is adjusted such that the timing at which the ONU 20 responds to the EB 10000 coincides with the response time of the ONU already connected. Here, on the basis of the adjusted standard response time, an EqD2 is calculated. After the ONU 20-1 is notified of the EqD2, the ONU 20-1 outputs a signal at the timing based on the EqD2. After notifying of the EqD2 and setting thereof in the register inside the ONU 20-1 has finished, the ONU 20-1 comes into operation state 5214. By taking the opportunity of completion of the start-up process 2 (S213 to be detailed later), the OLT 10 moves to operation state with the ONU 20-1 (S215).

After the ONU 20-1 moves to the operation state, communication complying with the recommendation is executed. In other words, ONU 20-1 transmits a request for bandwidth of an upstream signal (specifically, data cumulative state report inside a transmission queue in the ONU 20-1) 5216, the request for transmission is relayed by the EB 10000, and the OLT 10 receives the request for bandwidth 5217. Responsive thereto, the OLT 10 determines, on the basis of DBA, assignment of communication bandwidths of upstream signals to the individual ONUs 20 (S218). The calculated bandwidth assignment information is inserted in a BWmap (Bandwidth Map) field (not shown) contained in the header portion of a downstream signal, and transmitted to the ONUs 20 (S219). Practically, the bandwidth assignment information S219 is received by the EB 10000. The EB 10000 transfers the downstream signal as directional bandwidth assignment signal for the ONU 20-1 5220. The ONU 20-1 receives this signal, and transmits an upstream signal S221 in accordance with instructed timing and transmission amount. The transmitted signal is transferred by the EB 10000 to the OLT 10, and reaches it as an upstream signal S222.

It is to be noted that the series of processes comprised of requesting for upstream signal bandwidth from the ONU 20 (S216, S217), performing DBA in the OLT 10 (S218) and notifying the ONU 20 of upstream signal bandwidth (S219, 5220) are repeated periodically. In accordance with the DBA process effected each period, the OLT 10 compares an optical signal received from the ONU 20 with a value stored in each EqD information DB 1072, and confirms its reception timing every upstream signal (upstream frame). If the bandwidth assignment is done, that is, permission for data transmission is obtained, the ONU 20 transmits the upstream signal in accordance with the transmission instruction (S218). If the reception timing is shifted, the EqD value is corrected and the ranging is performed over again as described previously.

Figure 6:
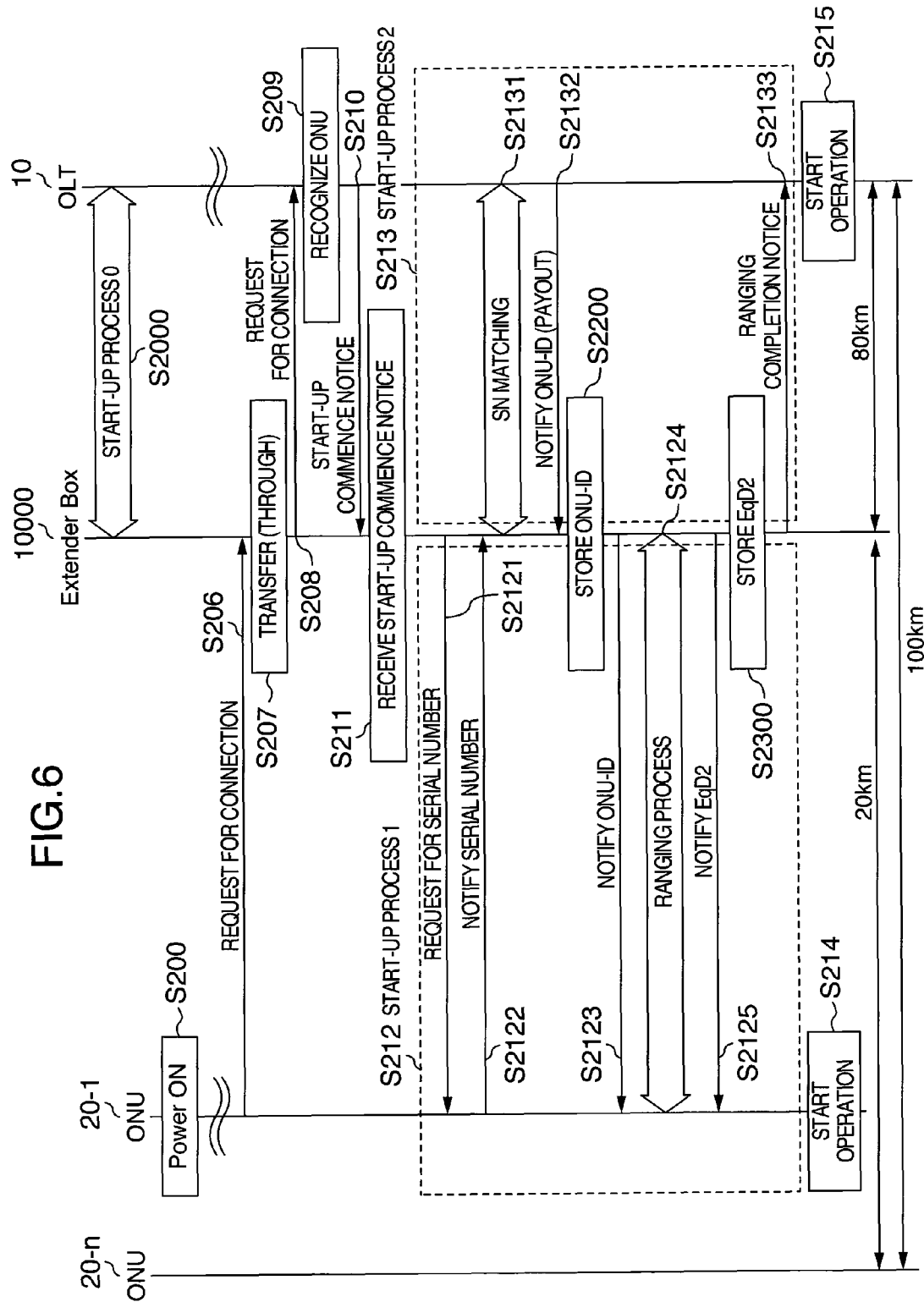
FIG. 6 is an action sequence diagram illustrating a detailed action example of the PON in the present invention.

FIG. 6 is an action sequence diagram illustrating a detailed action example of the PON in the present invention, and shows a detailed process example of the start-up process 1 (S212) and start-up process 2 (S213). Other steps than those inside blocks S212 and 5213 enclosed with dashed line are the same as those explained in FIG. 5.

Under the stipulation pursuant to the ITU-T recommendation G.984.3, when the OLT 10 detects a new connection of the ONU 20-1, it sends to the ONU 20-1 a request frame for confirming a Serial Number (SN). In the present embodiment, the OLT 10 transmits a start-up commence notice message for instructing the transmission start of the request frame (S210). A Vendor Specific OAM message (VSM message) in the POLAM message stipulated in the G.984.3 is used as the message S210. Of course, the message is not limited to this VSM message and another type of message may be used. Alternatively, as described later, even if there is the EB 10000, the frame to be transmitted to the ONU stipulated in the recommendation may be transmitted, and the EB 10000 may be configured to transfer the frame to the ONU 20-1 in the reception process in step 211.

The start-up process 1 (S212) shown in FIG. 5 is decomposed into steps S2121 to S2125, S2200 and S2300. The start-up process 2 (S213) is also decomposed into steps S2131 to S2133, S2200 and S2300.

When receiving a start-up signal S210 from the OLT 10, the EB 10000 terminates the message and sends an SN request signal S2121 newly issued by the EB 10000. Responsive thereto, the ONU 20-1 sends to the EB 10000 a signal notifying of SN S2122 containing an SN set in its own. After the SN has been received, a SN matching process S2131 is conducted on the section 100 between the EB 10000 and the OLT 10.

When it is confirmed that the SN received from the OUN 20-1 is correct, the OLT 10 issues an ONU-ID as an identifier assigned to the ONU 20-1. The EB 10000 is notified of this ONU-ID which is inserted in the down communication message (S2132), and then transferred from the EB 10000 to the ONU 20-1 (S2123). The ONU-ID is also stored in the DB11061 of the ONU manager 11060 in EB 10000 (S2200), and used for the subsequent operation. It is because in order to make correspondence between the ONU identifier and the EqD2 information and to use the existing PLOAM frame, a frame having the ONU-ID as parameter needs to be set.

After confirmation of the correspondence relation between the new ONU 20-1 and the ONU-ID by means of the ONU manager 11060 inside EB 10000, the second ranging, specifically, RTD measurement between the ONU 20-1 and the EB 10000 is performed (S2124). In the present process, the ranging controller 11050 of EB 10000 may conduct an action similar to the ranging of the OLT 10 stipulated by the ITU-T recommendation G.984.3. In the EB 10000, an EqD2 to be allotted to the ONU 20-1 is determined from the RTD measurement result, and then a value of the EqD2 is stored in the EqD2 DB 12510 of the ranging controller 11050 (S2300) and informed to the ONU 20-1 (S2125). In the ONU 20-1, this value of EqD2 is stored in the EqD2 information DB 2072 and used for the subsequent operation such as signal transmission/reception. Further, after completion of storing the EqD2 in the DB 11051, the EB 10000 transmits a ranging completion notice to notify the OLT 10 of completion of ranging process in respect of the ONU 20-1 (S2133).

As the above procedure proceeds, the ONU 20-1 moves to operation state S214, and the OLT 10 also moves to operation commence state S215. In order to synchronize state transition of the OLT 10 and ONU 20 at both ends of the PON section 80 with each other in this manner and to manage the connection state of the ONU 20-1, it is necessary for the OLT 10 to acquire a start-up completion notice (S213) of the ONU 20-1 from the EB 10000. As this notice, the aforementioned ranging completion notice S2133 is used. With respect to this notice, a VSM message which is a kind of PLOAM message can be used like the start-up commence notice S210.

When receiving also the notice about the connection management of the ONU 20 by way of the ranging completion notice S2133 from the EB 10000, the ONU controller 1060 of the OLT 10 checks the contents of the message, and if the message is the connection completion notice of ONU 20-1, registers information concerning the management of the ONU 20-1 in the ONU management database 1061 of ONU controller 1060 to make the ONU 20 move to the operation state.

As shown in the above procedure, in the PON of the present invention, parameters such as SN and ONU-ID for managing the connection conditions of the ONUs 20-1 to 20-n are managed by the OLT 10, whereas the EB 10000 is in charge of only the ranging portion of the ONU 20 start-up procedure. This ensures that even if, as in the existing technology, the PON section 80 is extended while holding the function for correctly managing the ONU 20 in the OLT 10, the section in which the second ranging is performed is not between the OLT and ONU but between the EB and ONU. Therefore, the operation can be done with decreasing (without increasing) part of the start-up time of the PON 40 (message transmission/reception waiting time during ranging process time).

It will be appreciated that in the PON 40 of the present invention, some start-up procedures different from the aforementioned start-up procedure of the ONU 20 can be adopted. It is, for example, as described above, a method in which as the start-up commence notice S210 from the OLT 10, an SN request message stipulated by the ITU-T recommendation G.984.3 is used. In this case, the EB 10000 only transfers (goes through) the received signal of start-up commence notice (S210) to the ONU 20 (S2121). In this case, definition of the VSM message can be less by one than that in the aforementioned procedure, and further, the time of generation/transmission of the start-up commence notice S210 in the OLT 10 and the time of reception process of the notice in the EB 10000 can further be shortened.

In executing the start-up process 0 (S2000) of the PON system 40, a method in which the ONU-IDs managed by the OLT 10 are all informed to the EB 10000 in advance can also be practiced. In this case, the EB 10000 is configured to determine an ONU-ID in accordance with the matching result of SN. Then, when notifying of ONU-ID (S2132), the notifying direction is inversed so that the OLT 10 receiving a notice of the ONU-ID determined by the EB 10000 is configured to store the value in the DB 1061. In the present case, omission of notifying of the ONU-ID by the OLT 10 make it possible that the process time of the start-up process 1 (S212) and start-up process 2 (S213) can be shortened. Meanwhile, the ONU-ID may be informed no later than termination of the start-up process 2 (S213), and may be informed through ranging completion notice (S2133).

Further, another method in which when executing the start-up process 0 (S2000) of the PON system 40, all SNs managed by the OLT 10 are also informed to the EB 10000 in advance is practicable. In the present case, start-up actions following the start-up commence notice (S210) in FIG. 6 are configured to be delegated to the EB 10000, and start-up process 2 (S213) is configured to substantially be omitted to use only the ranging completion notice (S2133). Since in the present case, transmission/reception and confirmation action of the control signal between the EB 10000 and the OLT 10 can be omitted, the start-up process time can further be shortened. But, the data reliability of ONU-ID and SN which have been transmitted initially from the OLT 10 to the EB 10000 is strictly required.

Figure 7:
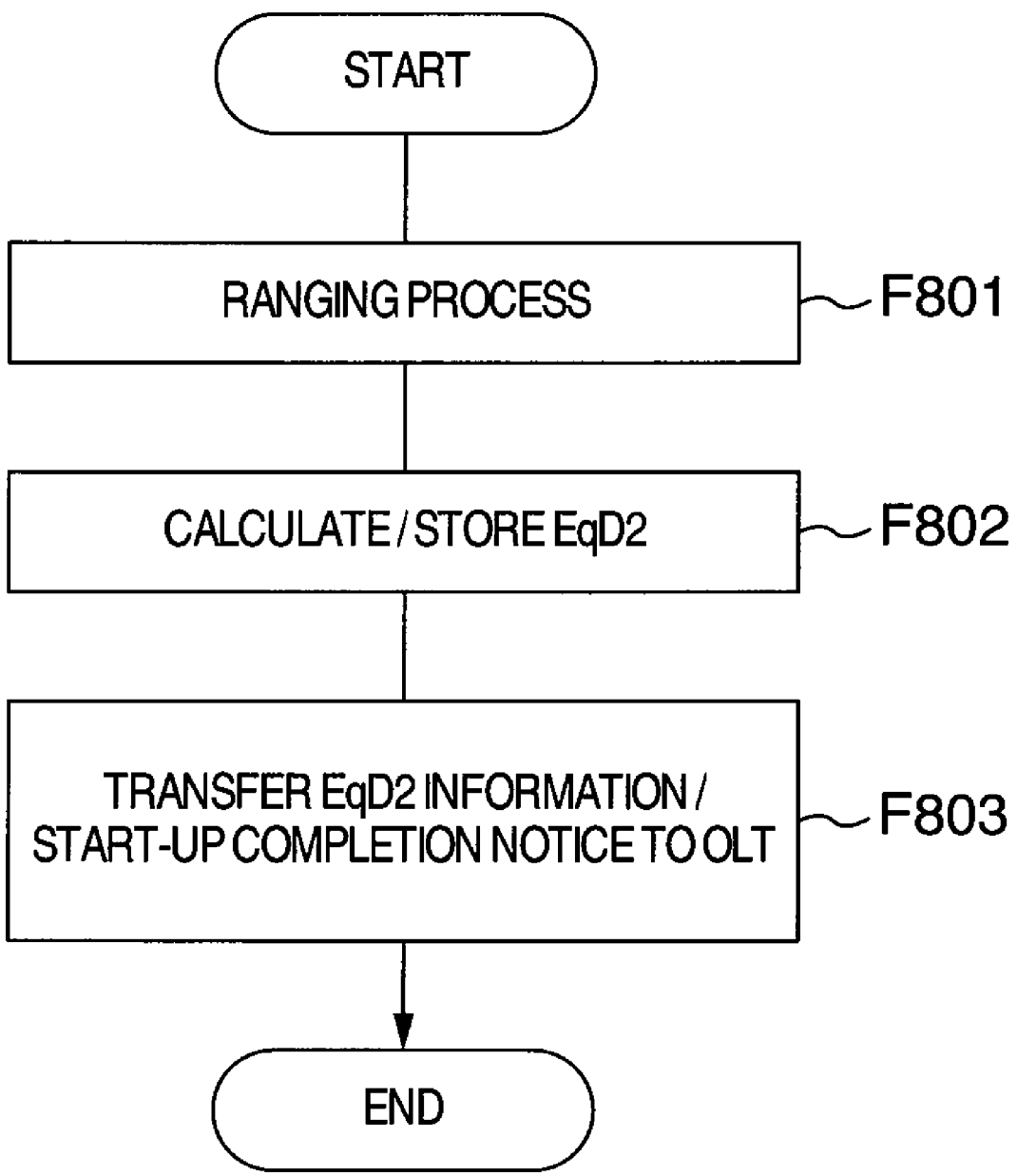
FIG. 7 is a flowchart illustrating an action example of the EB in the present invention.

FIG. 7 is a flowchart illustrating an action example of the EB in the present invention concerning the ranging process in respect of the ONU.

The ranging stipulated by the ITU-T recommendation G.984.3 is used, and when the ONU-ID is assigned to the ONU 20 through process S2123 for notifying of the ONU-ID in FIG. 6, ranging S2124 is performed (F801).

In the ranging, an RTD between the EB 10000 and an ONU 20-1 newly requesting connection is measured, and by consulting the EqD2 set in the existing ONU 20 on the basis of the measured value, an EqD2 is calculated/stored in such a manner that the signal from the ONU 20-1 newly requesting connection is delayed similarly to a signal from another ONU 20 (F802), and further this EqD2 is informed to the ONU 20-1 (FIG. 6:S2125, 2300).

The completion of notifying the ONU 20-1 of the EqD2 is regarded as completion of the ONU start-up process, and so the ONU 20 is notified of the EqD2 and the OLT 10 is notified of completion of the start-up process (F803, FIG. 6:S2133).

Figure 8:
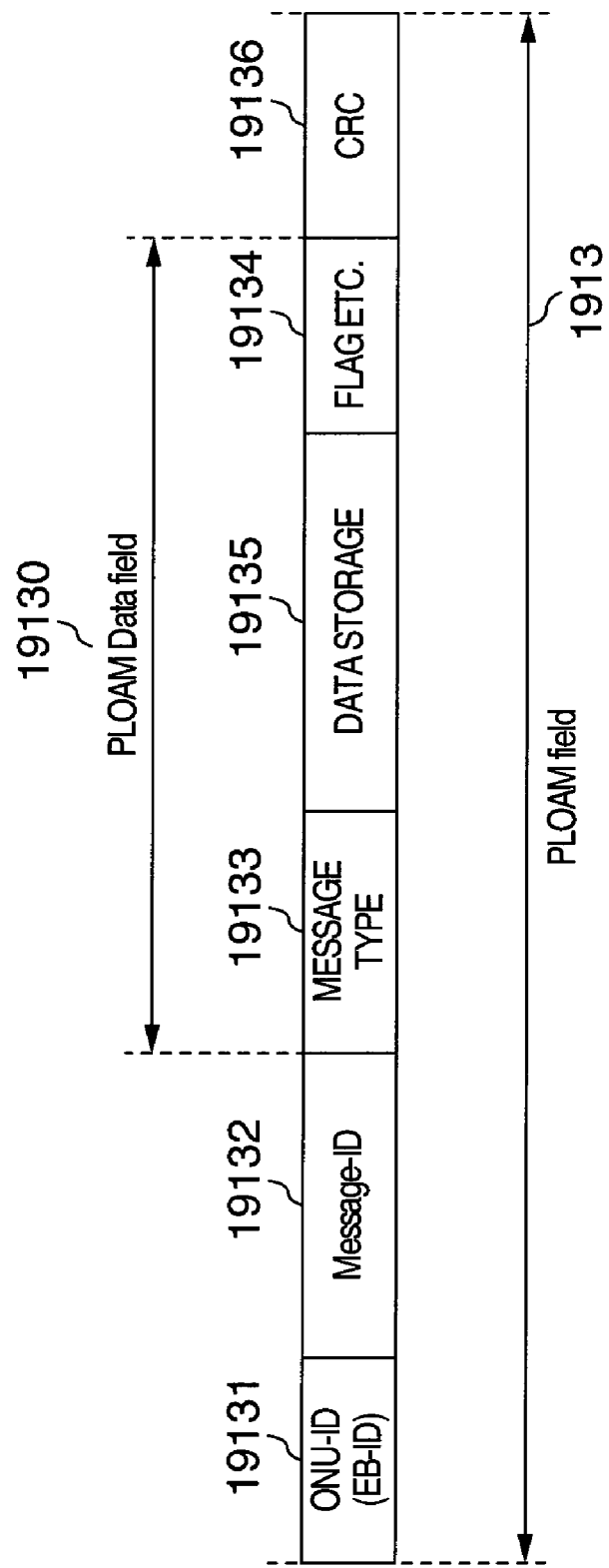
FIG. 8 is a diagram illustrating a structure example of part of a downstream signal in the PON.

FIG. 8 is a diagram illustrating a structure example of part of a downstream signal used in the PON.

Hereinafter, the structure example of a start-up commence notice of the ONU 20 which the OLT 10 transmits to the EB 10000 (FIG. 6:S210) will be explained. This signal is based on the PLOAM frame of the G-PON, and uses a PLOAM field 1913 contained in the header of the downstream frame received by all of the ONUs 20-1 to 20-n. This field is also used for controlling the start up of the ONU 20 (the assignment of ONU-ID and Alloc-ID and the like), monitoring the distance and fault in operation, and the like.

Pursuant to the original recommendation, the ONU-ID indicative of the destination ONU of the signal is entered in an area 19131, but in the PON of the present invention, the start-up commence notice message is destined for the EB 10000, and therefore, an ID designating the EB 10000 as a destination (EB-ID) is specified and inputted. Then, the signal is constructed to include a Message-ID 19132 which indicates that the present frame is a message (VSM) defined independently of the recommendation by an operator of the PON system. This signal is also constructed to be followed by a data field 19130 and by a CRC field 19136 used for error detection. In a message type 19133 of data field 19130, an identifier indicative of a start-up commence notice message is inserted. A data storage 19135 is not used in the present embodiment, and so, a suitable fixed pattern may be determined and inserted therein. In the flag etc. 19134, a flag showing the validity of the present message and a pattern for detecting an error in the data field 19130 of the present message are entered.

In addition, in the SN matching process S2131 of FIG. 6, a message according to the present format is forwarded from the EB 10000 to the OLT 10. Specifically, an identifier indicative of an SN confirmation request is entered in the message type 19133, an identifier 19133 indicative of an SN number for indicating the start-up objective ONU 20-1 is entered in the data field 19130, and a data field 19135 including associative control parameter 19134 necessary for start-up is entered in the flag etc. field.

Figure 9:
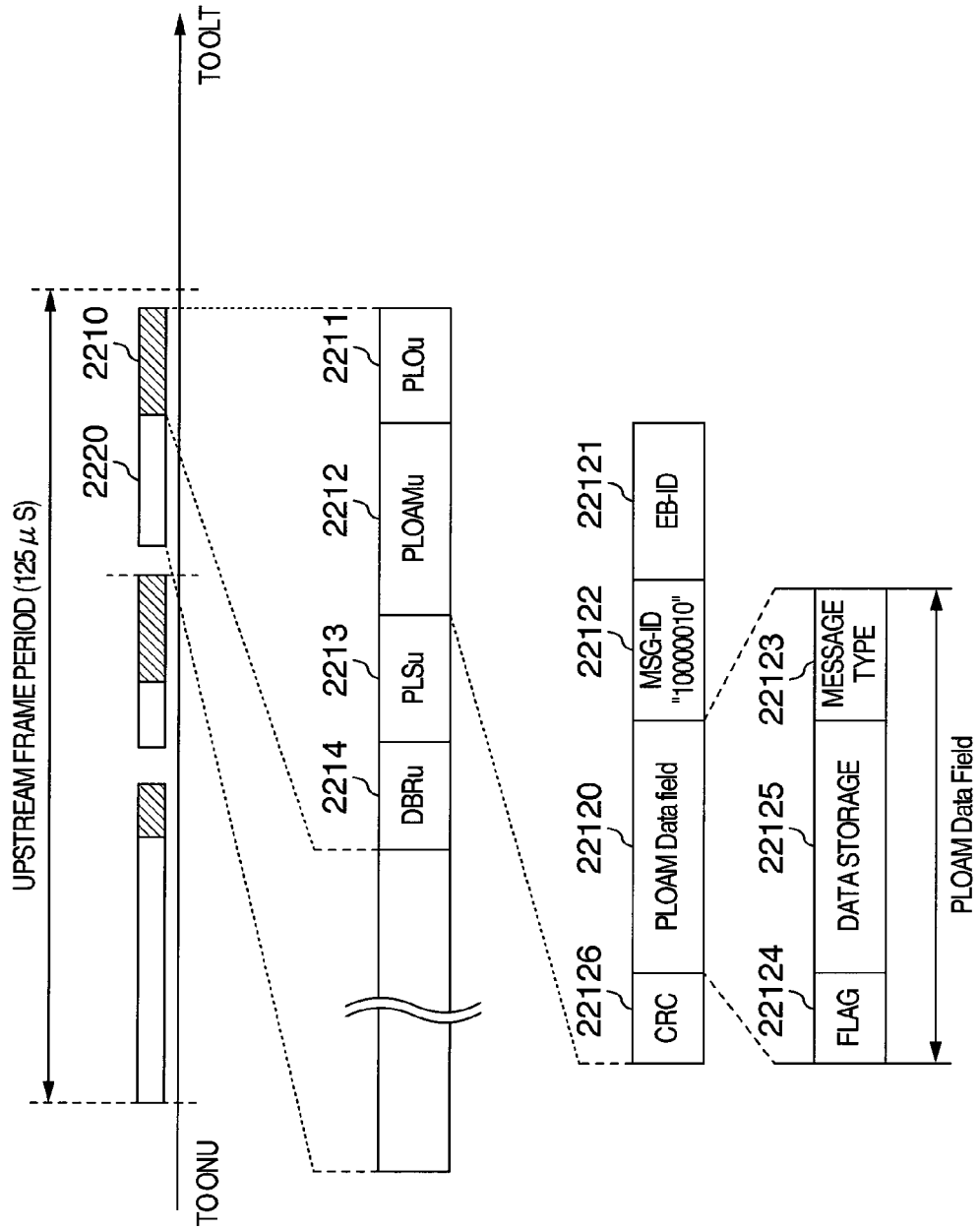
FIG. 9 is a diagram illustrating a structure example of part of an upstream signal in the PON.

FIG. 9 is a diagram illustrating a structure example of part of an upstream signal used in the PON.

Hereinafter, the structure example of a start-up completion notice of ONU 20-1 (FIG. 6:S2133) which the EB 10000 transmits to the OLT 10 will be described. As in FIG. 8, this signal is also based on the PLOAM frame of G-PON and uses the PLOAM field.

In upstream communication, there are frames transmitted from a plurality of ONUs within 125 μs. A header 2210 of a frame contains a PLOu (Physical Layer Overhead Upstream) 2211, a PLOAMu 2212, a PLSu (Power leveling Sequence Upstream) 2213 and a DBRu (Dynamic Bandwidth Report Upstream) 2214. The PLOu 2211 containes a preamble for frame synchronization and a signal pattern for delimiter. The PLOAMu 2212 corresponds to a PLOAM of downstream frame, and is defined by the existing recommendation as a message for performing control necessary for operating the ONU 20, but in the present embodiment, the signal transmission originator is the EB 10000, and accordingly, a specified identifier of the transmission originator EB 10000 (hereinafter referred to as EB-ID) is entered in an area 22121 in which the identifier of the transmission originator ONU is entered as downstream signal in FIG. 8. Then, the PLOAMu 2212 contains an EB-ID 22121, a message identifier MSG-ID 22122, a body of the message body (data payloads) 22120 and a CRC 22126 for error detection and correction as downstream signal in FIG. 8. The PLSu 2213 is utilized when monitoring transmission power on the side of EB 10000 to determine whether adjustment is necessary or not.

Even in the PON 40 in which the EB 10000 is introduced as in the present invention in order to extend the distance of the PON section 80 and increase the accommodation number of ONUs, the ranging can be carried out between the OLT 10 and the ONU 20 as the conventional PON by causing the EB 10000 to transfer (go through) a proper control signal without separately executing two processes separated by the EB 10000 (the ranging process between OLT 10 and EB 10000, and the ranging process between EB 10000 and ONU 20). But, as described above, the OLT waits for a response to the ranging from the ONU, and consequently, all of the ONUs which have already been connected for operation are required to interrupt communication. Therefore, according to insertion of the EB, the expectant waiting time prolongs to increase the communication interruption time of each ONU. In other words, the communication interruption time increases in the ONU in operation, affects the quality of signal which requires real time nature, makes the DBA process applied to all ONUs complicated, decreases the assignment and increases the waiting time for signal transmission. Hereinafter, by presuming that the existing ranging is used in the case of introduction of the EB 10000, ranging action in the PON of the present invention will be illustrated to explain effects thereof with reference to the drawings.

Figure 10:
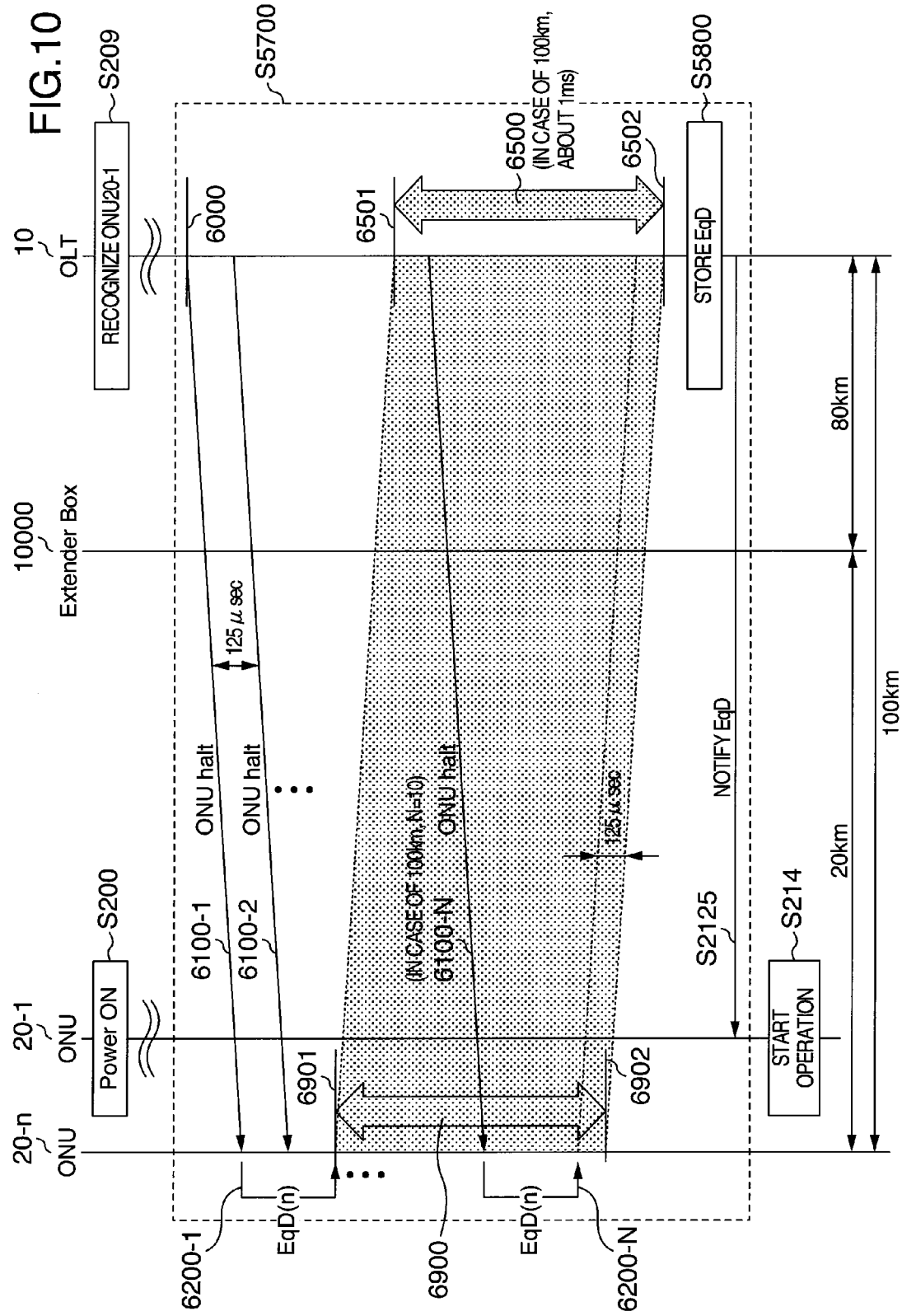
FIG. 10 is a diagram for explaining a virtual action example of the PON in the present invention.

FIG. 10 is a diagram for explaining a virtual action example of the PON in the present invention, the ranging process time will be explained by presuming that the ranging is performed by the OLT directly to the ONU.

When recognizing the ONU 20-1 newly requesting connection (S209, similar to that in FIGS. 5 and 6), the OLT 10 starts ranging in respect of the ONU 20-1 at time 6000. Firstly, in order to wait for a response to ranging from the ONU 20-1, the OLT 10 starts transmitting an ONU halt message 6100 for interrupting signal transmission to the OLT by all of the ONUs 20 which have already been in operation. This message goes through the EB 10000 to reach the ONUs 20, and it is transmitted to all ONUs repeatedly according to the distance of the PON section 80 at every 125 µs from time 6000. In the conventional PON, the distance of PON section 80 is limited to a maximum of 20 km and so a response to ranging can be captured from the new ONU 20-1 by interrupting signal transmission from the existing ONU 20 for only a maximum of 250 µs, but the introduction of the EB 10000 increases the distance of the PON 80 to increase the RTD of a signal transmitted from the OLT 10 to the ONU 20 and of its response signal. Therefore, it is necessary to increase the time to wait for the ranging response from the ONU 20-1, that is, the time for the existing ONU 20 to interrupt signal transmission to the OLT 10. For example, as shown in the figure, if by introducing the EB 10000 to the trunk optical fiber 70, the distance from the OLT 10 to the EB 10000 is extended to 80 km and the distance of the PON section 80 is extended to 100 km which is five times as long as that in the conventional PON, the signal transmission is interrupted by the sum of a maximum of 1 ms and an additional process time at the EB 10000 for transferring (going through) signals, and possibly affects the quality of the signal requiring real time nature. Since the ONU 20 transmits an upstream signal after consuming a time to wait for a response in accordance with an EqD 6200-N set by the OLT 10, a time zone during which the ONU 20-n is prevented from transmitting a upstream signal has a width 6900 between times 6901 and 6902, but a time zone during which the OLT 10 cannot actually receive the upstream signal has a width 6500 between times 6501 and 6502. Namely, where, in the PON in which the transmission distance is extended by means of the EB, the OLT performs ranging directly to the ONU, a signal transmission interruption time is substantially proportional to the distance extended in comparison with the distance in the conventional PON.

Figure 11:
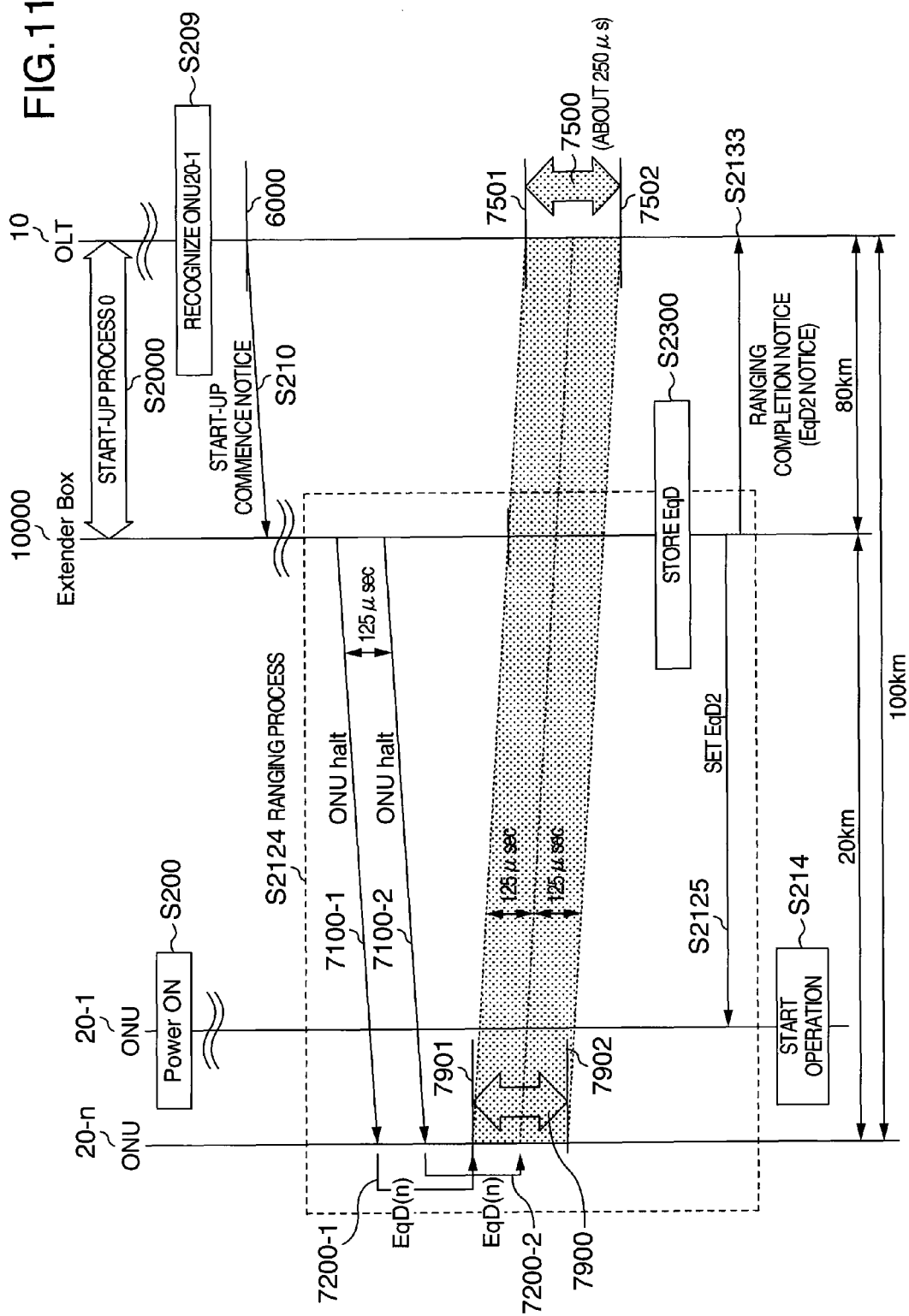
FIG. 11 is a diagram for explaining an action example of the PON in the present invention.

FIG. 11 is a diagram for explaining an action example of the PON in the present invention performing the ranging process by separating it into two by the EB.

In the PON 40 of the present invention, as described previously, the delay value between the OLT 10 and the EB 10000 is determined at the start-up of the PON 40. Specifically, in start-up process 0 as shown at S2000 in FIG. 11 and FIGS. 5 and 6, the distance (80 km in the present embodiment), RTD and EqD1 of the trunk optical fiber 70-1 common to all ONUs 20 (or PON 40) are measured/determined/stored. Then, by measuring an RTD for each of the ONUs 20 existing within the remaining maximum distance of 20 km from the EB 10000 in the present invention to determine the EqD2 in the subsequent process, operation of the PON 40 becomes possible.

When, after completion of the start-up process S2000, the OLT 10 recognizes an ONU 20-1 newly requesting connection (S209, similar to FIGS. 5 and 6), it starts ranging in respect of the ONU 20-1 at time 6000. Specifically, the OLT 10 transmits a start-up commence notice to the EB 10000 at time 6000 (S210), and the EB 10000 receives this notice (S211). Subsequently, the EB 10000 commences start-up process 1 (S212 in FIGS. 5 and 6), and performs the ranging in respect of the ONU 20-1 newly requesting connection (S2124, similar to FIG. 6).

Specifically, in order to wait for a response to ranging from the ONU 20-1, the EB 10000 starts transmitting, to all of the ONUs which have already been in operation, an ONU halt message 7100 for causing them to interrupt signal transmission to the OLT 10 (EB 10000). This message is transmitted to all ONUs repeatedly according to the maximum distance between the EB 10000 and the ONU 20 every 125 µs, similarly to the message 6100 from the OLT 10. Since in the present embodiment the sum of trunk optical fiber 70-2 and branching optical fiber 71 between the EB 10000 and each of the ONUs 20 is set to a maximum of 20 km, the EB 10000 can obtain a response to ranging from the new ONU 20-1 by interrupting signal transmission from the existing ONUs 20 for only a maximum of 250 µs. Namely, according to the PON 40 of the present invention, even if the distance of the PON section 80 extends by the introduction of the EB 10000, the interruption time of the signal from the ONU due to the ranging is configured to depend on only the maximum distance from the EB 10000 to the ONU 20 by separating the ranging process by EB 10000, and therefore, even if the distance of the PON section 80 is extended while keeping this maximum distance short, the signal transmission interruption time of the existing ONU accompanying the introduction of the new ONU can be prevented from increasing.

In the EB 10000, the number of transmission (signal transmission interruption time of ONU) of the ONU halt message 7100 is set in a manner (not shown) similar to the conventional method for setting by the OLT of PON, because the maximum value of sum of the trunk optical fiber 70-2 from the EB 10000 to each of the ONUS 20 and the branching optical fiber 71 is determined in advance in the system design. Namely, if the ONU 20 is distant from the EB 10000 by a maximum of 40 km, the ONU halt message 7100 may be transmitted four times.

Since the ONU 20 transmits an upstream signal after the lapse of a waiting time for a response in accordance with the EqD 7200-n, the time zone during which the ONU 20-n cannot transmit the upstream signal has a width 7900 between times 7901 and 7902, but the time zone during which the OLT 10 cannot actually receive the upstream signal has a width 7500 between times 7501 and 7502. As is clear from comparing FIG. 10 with FIG. 11, by performing the ranging from the EB 10000 which is close to an ONU 20, a communication interruption time of another ONU 20 can be decreased, and so the quality of the signal requiring the real time nature can be prevented from degrading.

As explained above, the PON 40 of the present invention is configured to move part of the parameter necessary for management of the ONU 20 from the OLT 10 to the EB 10000 to operate, and so the operation efficiency of the PON can be improved. Specifically, the start-up time of the newly connected ONU can be shortened. Further, the process load in the OLT 10 can be decreased, and hence improvements in signal transmission capability such as high-speed/high-efficiency of DBA process can be expected.

Figure 12:
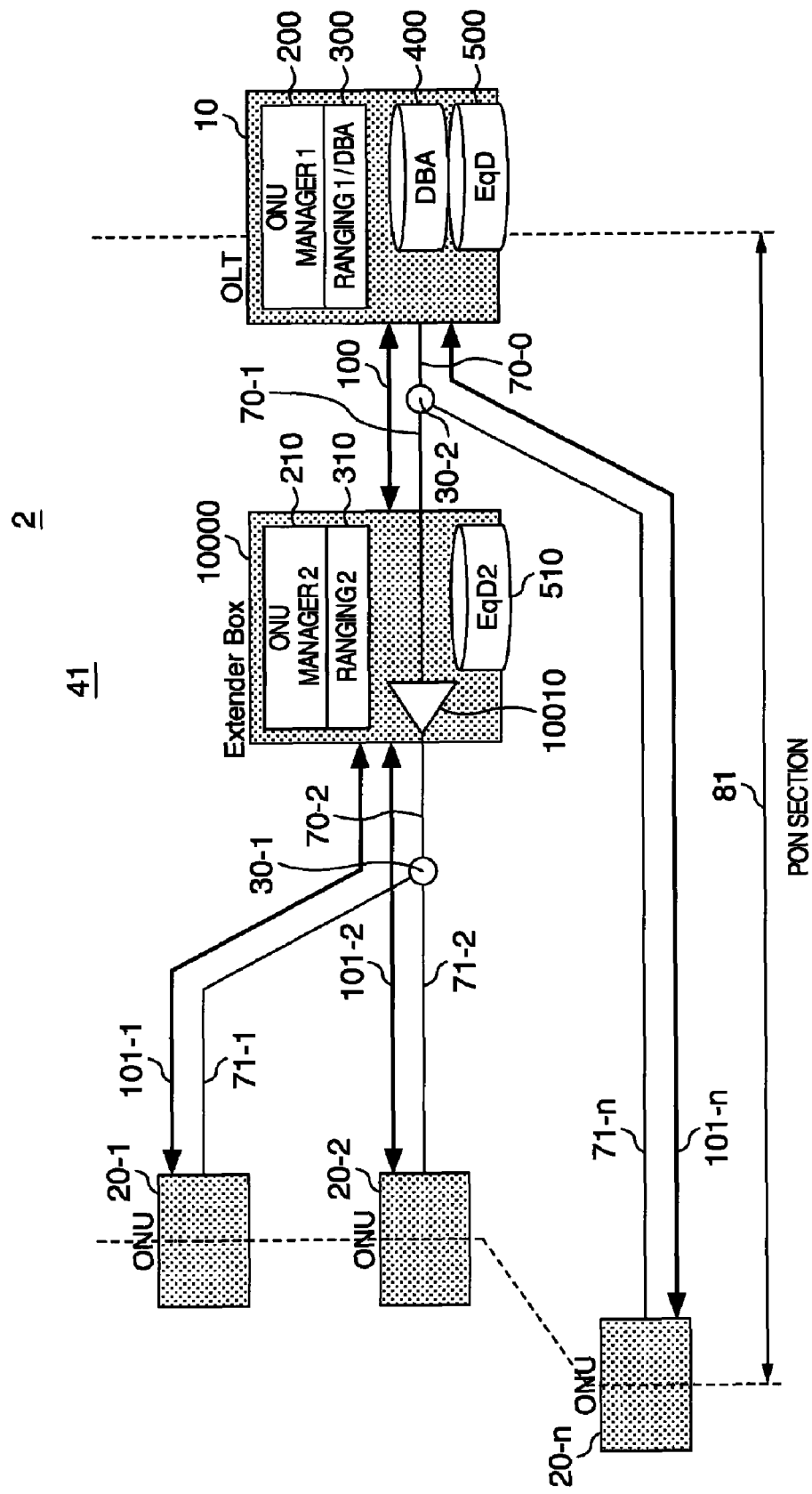
FIG. 12 is a diagram illustrating another configuration example of the optical access network using the PON.

Hereinafter, as another embodiment of the PON of the present invention, an example of the EB 10000 inserted at the different position will be explained. FIG. 12 is a diagram illustrating another configuration example of the optical access network using the PON, where an EB is inserted in the branching optical fibers of the PON.

Like the optical access network 1 shown in the above-described embodiment, an optical access network 2 comprises an OLT 10, a plurality of ONUs 20-1 to 20-n, an optical splitter 30, a trunk optical fiber 70 (70-0, 70-1 and 70-2), a PON section 81 including a plurality of branching optical fibers 71-1 to 71-n, and a PON 41 including an EB 10000 installed midway of a PON section 81. In the figure, an access network 90 connected to the OLT 10 and a subscriber network 50 connected to individual ONUs 20 are configured identically to those in the access network 1, and so their illustration is omitted.

In the present embodiment, an optical splitter 30-2 is between the EB 10000 and the OLT 10. In other words, part of the ONUs 20-n are connected directly to the OLT 10 but not through the EB 10000, and the EB 10000 is configured to be inserted in part of the branching optical fibers 71. In the PON section 81, communication is carried out by means of an optical signal between the OLT 10 and each of the ONU 20-1 to 20-n. In other words, the wavelengths of optical signals used in the PON are different $\lambda$up for upstream and $\lambda$down for downstream so that in an optical fiber sections 100 and 101, upstream and downstream may not interfere. Then, a downstream signal transmitted from the OLT 10 is partly branched at the splitter 30-2, and thereafter transmitted to the ONU 20-n and EB 10000. The signal going through the EB 10000 is further branched at the splitter 30-1 to reach all of the ONUs 20-1 to 20-2 accommodated in the PON system. For upstream communication from each of the ONUs 20-1 to 20-n to the OLT 10, optical signals all having the same wavelength $\lambda$up are used. An ONU transmitting a corresponding upstream signal by means of time-division multiplex system is identified on the OLT side. In order that when the OLT 10 receives upstream signals, GEM packets from the individual ONUs 20 can be discriminated from one another, the individual ONUs 20 transmit upstream signals at different transmission timings from each other so as to prevent individual upstream signals from colliding/interfering with one another on the trunk optical fiber 70. Meanwhile, the ONU 20-n and OLT 10 mutually connected directly acts in the same manner as those in the PON stipulated in the existing recommendation.

In the figure, configuration and action of the OLT10, ONU 20 and EB 10000 are the same as described previously in connection with FIGS. 2 to 4. Namely, the EB 10000 is configured to start up the ONU 20 by relaying an instruction from the OLT 10, the EB 10000 acts in behalf of the OLT 10 to execute part of the function to manage the ONU. Specifically, the ranging in respect of the ONUs 20 to be connected subordinately to the EB 10000 is performed in two processes separated by the EB 10000. On the other hand, in respect of the ONU 20-n connected directly to the OLT 10 without routing though the EB 10000, acts identically to that in the PON speculated in the existing recommendation.

In the configuration of the figure, the OLT 10 performs also ranging of communication section 100 at the time that the EB 10000 is started (corresponding to start-up process 0 (S2000) in FIGS. 5 and 6). Further, concurrently with the ranging performed by the OLT 10 in respect of the EB 10000, ranging in respect of the directly connected ONU such as ONU 20-n is performed. Accordingly, there are two kinds of EqD information of ONUs 20 held in the ranging controller 1070 of OLT 10. Namely, the EqD is determined for the ONUs 20 connected through the EB 10000 on the basis of the result of ranging performed by the EB 10000 and the result of ranging in the section 100 performed by the OLT 10. On the other hand, the RTD for the directly connected ONU 20-n is measured by the means stipulated in the recommendation, and the EqD is determined by the EqD in accordance with the measurement result. In respect of the ONUs 20 connected subordinately to the EB 10000, both the EqD1 and EqD2 are stored as in the previous embodiment, and in respect of the ONU 20-n connected directly to the OLT 10, EqD1 is stored, and the subsequent operation is carried out.

In the present embodiment, the EB 10000 is configured to perform ranging in respect of the ONUs subordinate thereto, and therefore, even during perfoming the ranging in respect of for example ONU 20-2, the ONU 20-n directly connected to the OLT 10 can continue normal communication, making it possible to efficiently use the upstream signal bandwidth in the optical access network 2. Besides, even when an ONU 20 subordinate to the EB 10000 is newly connected in operation of the PON, the influence upon another ONU 20 can be decreased. While the previous embodiment is effective for the case where all of the ONUs subordinate to the OLT exist at remote distances from the OLT, the configuration of the present embodiment is effective in the case where the distances from the OLT to the ONUs are uneven considerably, for example, the case where part of the ONUs is near the OLT and the remaining ONUs is remote from the OLT.

Needless to say, since the EB 10000 undertakes the distance measurement of the PON section 80 performed conventionally by the OLT 10, the effect of reducing the control signal processing time for an extended PON section by the EB 10000 can also be expected like the previous embodiment. Further, like the previous embodiment, speed-up of start-up in the ONU and simplification of the process in the OLT 10 can be achieved.

Figure 13:
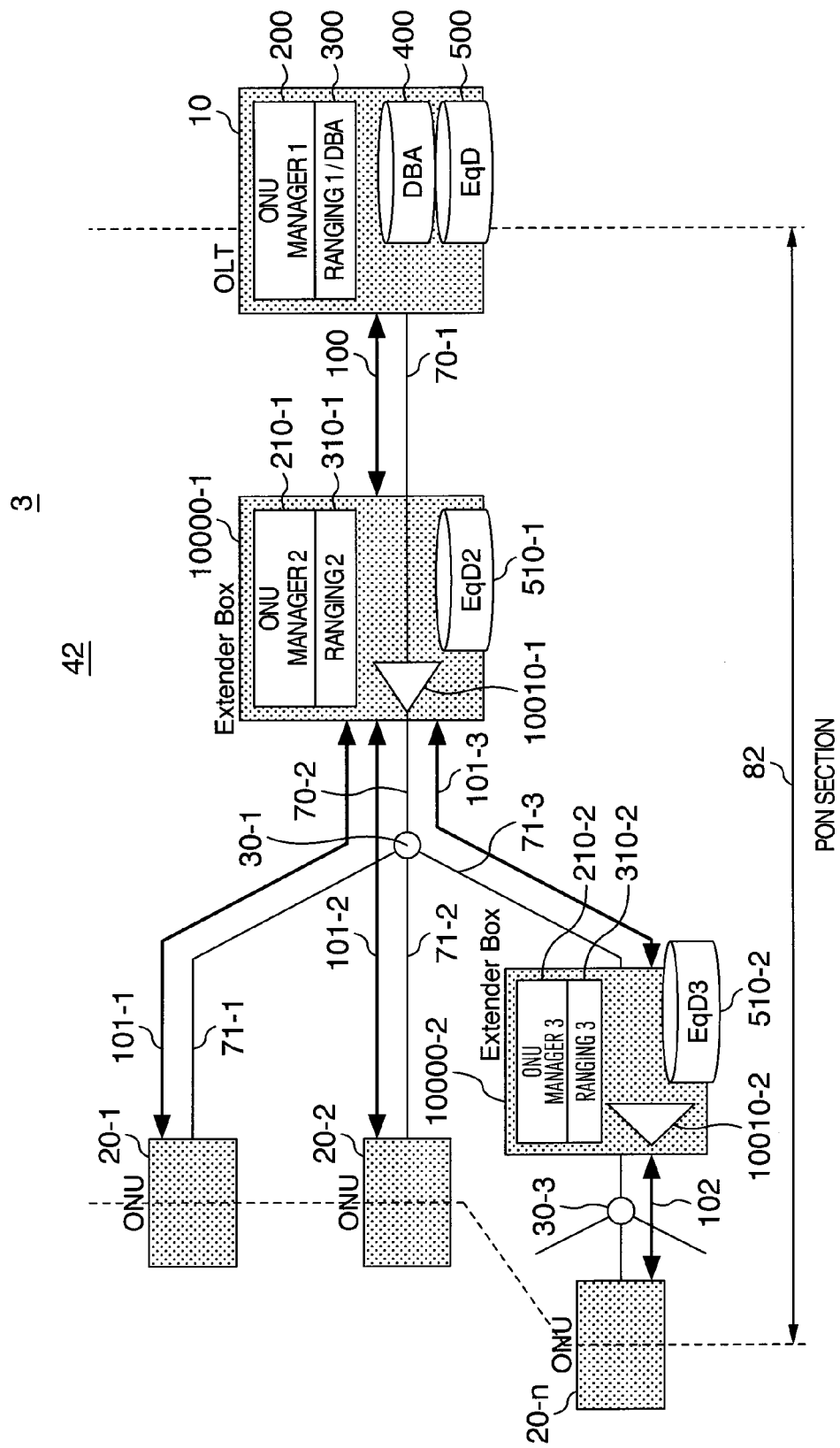
FIG. 13 is a diagram illustrating still another configuration example of the optical access network using the PON.

FIG. 13 is a diagram illustrating still another configuration example of the optical access network using the PON, which is a multi-stage optical relay system.

In the present embodiment, EBs 10000-1 and 10000-2 are connected in a multi-stage fashion. Specifically, the figure illustrates an optical access network 3 in which the configuration via only one EB 10000-1 and the configuration via two EBs 10000-1 and 10000-2 mix, that is to say, the number of EBs 10000 necessary to communicate between the OLT and the individual ONUs varies depending on the individual ONUs. But, the ranging process is much more divided, thus ensuring that a great number of ONUs can be connected to the OLT 10 or the distance of optical access communication section can be more prolonged. Further, the EB 10000 managing the ranging process is divided and therefore, in connecting a new ONU, the mutual influence upon ONUs (influence of communication interruption time) can be reduced much more than that in the two previous embodiment.

Meanwhile, as with the EB 10000 explained in connection with FIG. 1, the EB 10000-1 includes the ONU manager 2 210-1, ranging 2 processor 310-1, EqD2 information DB 510-1 and optical relay functional section 10010-1, and the EB 10000-2 include the ONU manager 3 210-2, ranging 3 processor 310-2, EqD3 information DB 510-2 and optical relay functional section 10010-2.

Figure 14:
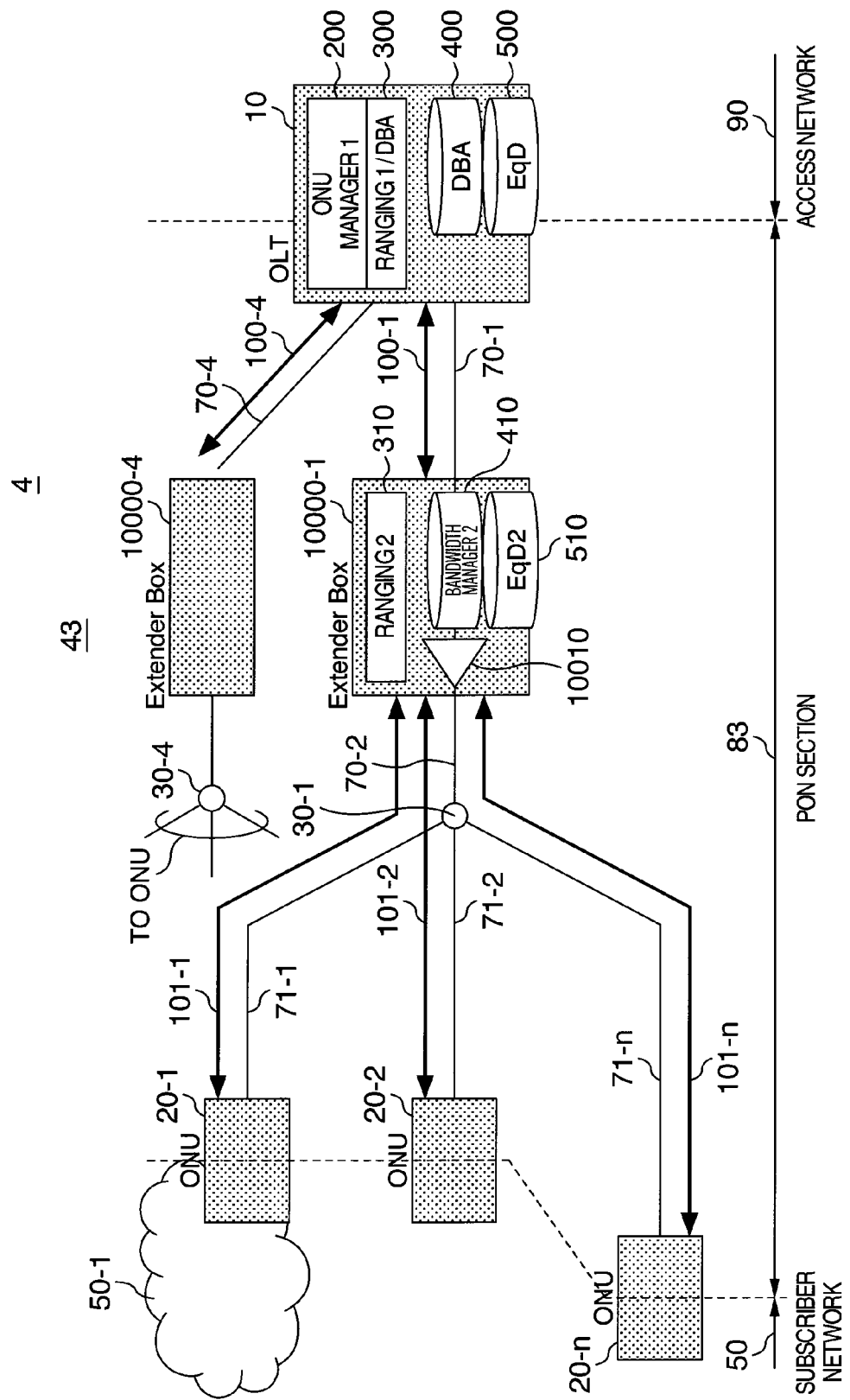
FIG. 14 is a diagram illustrating yet still another configuration example of the optical access network using the PON.

FIG. 14 is also a diagram illustrating yet still another configuration example of an optical access network using a PON in which a plurality of EB are connected to the OLT.

In the present embodiment, since the plurality of EBs are connected to the OLT 10, the OLT 10 is required to have high accommodation capability, but more ONUs can be accommodated than in the access network shown in connection with the previous embodiments. Therefore, the configuration of the present embodiment is effective in the case where ONUs 20 accommodated in the OLT 10 are placed in a very wide area.

Meanwhile, as with the ranging 1/DBA 300 processor and DBA 400 of the OLT 10, the DBA manager 2 410 of the EB 100000-1 determines, responsive to the request for bandwidth from the ONUs 20 subordinate to the EB 10000-1, assignment of communication bandwidths of upstream signals to the ONUs 20. Further, the EB 10000-4 includes the ONU manager, ranging 1/DBA processor, DBA manager and optical relay functional section as with the EB 10000-1.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical communication system having a master station connected to a plurality of slave stations via an optical fiber network provided with an optical splitter, comprising:
   a relay unit for relaying in said optical fiber network signals transmitted and received between said master station and said plurality of slave stations;
   said master station including a first controller for measuring a transmission distance or a transmission time between said master station and said relay unit;
   said relay unit including a second controller for measuring a transmission distance or a transmission time between said relay unit and said plurality of slave stations;
   wherein said master station determines, on the basis of a result of a first measurement performed by said first controller and a result of a second measurement performed by said second controller of said relay unit as well as reports from said plurality of slave stations, timings for the individual slave stations to respectively transmit signals to said master station;
   said second controller of said relay unit performs said second measurement in respect of one of said plurality of slave stations which is designated by said master station, and instructs slave stations other than said designated slave station to stop transmitting signals to said relay unit or said master station; and
   said master station receives the signals from said plurality of slave stations multiplexed through said optical fiber network.

2. An optical communication system according to claim 1, wherein in said optical fiber network, said relay unit is inserted in a first optical fiber between said master station and said optical splitter.

3. An optical communication system according to claim 1, wherein said first controller of said master station performs said first measurement at the start-up of said optical communication system, and after performing said first measurement, instructs said relay unit to perform said second measurement in accordance with states of connection to said plurality of slave stations via said optical fiber network.

4. An optical communication system according to claim 1, wherein the time to perform said first measurement and the time to perform said second measurement depend on the position of said relay unit in said optical fiber network, and are set in advance in said first and second controllers, respectively, by an operator of said optical communication system.

5. An optical communication system having a master station connected to a plurality of slave stations via a plurality of optical fibers and a plurality of optical splitters, comprising a first optical splitter for collecting a plurality of first optical fibers from some slave stations of said plurality of slave stations, and a second optical splitter for collecting a plurality of second optical fibers from slave stations other than said some slave stations and connecting to said master station via said second optical fibers;
   wherein a third optical fiber through a relay unit for relaying optical signals from said first optical splitter for collecting said plurality of first optical fibers and said second optical fibers are collected by said second optical splitter and connected to said master station via a fourth optical fiber;
   said master station includes a first controller for measuring a transmission distance or a transmission time between said master station and said relay unit or between said master station and slave stations other than said some slave stations; and
   said relay unit includes a second controller for measuring a transmission distance or a transmission time between said relay unit and said some slave stations; and
   wherein said master station determines, on the basis of a result of a first measurement performed by said first controller and a result of a second measurement performed by said second controller of said relay unit as well as reports from said plurality of slave stations, timings for the individual slave stations to respectively transmit signals to said master station;
   said second controller of said relay unit performs said second measurement in respect of one of said some slave stations which is designated by said master station, and instructs said some slave stations other than said designated slave station to stop transmitting signals to said relay unit or said master station; and
   said master station receives the signals which said plurality of slave stations have transmitted via said first and third optical fibers and via the second optical fibers, respectively and which have been multiplexed through said fourth optical fiber.

6. An optical communication system according to claim 5, wherein said first controller of said master station performs said first measurement at the start-up of said optical communication system or in accordance with states of connection to said plurality of slave stations other than said some slave stations via said second optical fibers, and after performing said first measurement, instructs said relay unit to perform said second measurement in accordance with states of connection to said some slave stations via said first optical fiber.

7. An optical communication system according to claim 6, wherein even when said second controller performs said second measurement, said master station continues reception of signals from slave stations connected to said second optical fibers other than said some slave stations.

8. A method for operating an optical communication system wherein a master station is connected to a plurality of slave stations via an optical fiber network provided with an optical splitter and a relay unit for relaying signals transmitted and received between said master station and said plurality of slave stations, comprising the steps of:
   a first controller of said master station measuring a transmission distance or a transmission time between said master station and said relay unit at the start-up of said optical communication system;
   a second controller of said relay unit measuring under the instruction of said master station, transmission distances or transmission times between said relay unit and said plurality of slave stations;
   said master station determines, on the basis of a result of a first measurement by said first controller and a result of a second measurement by said second controller as well as reports from said plurality of slave stations in operation of said optical communication system, timings for said plurality of slave stations to respectively transmit signals to said master station, and lets said plurality of slave stations transmit signals; and said second controller of said relay unit performs said second measurement in respect of one of said plurality of slave stations which is designated by said master station, and instructs slave stations other than said designated slave station to stop transmitting signals to said relay unit or said master station.

9. A method for operating an optical communication system according to claim 8, wherein said master station performs said first measurement by said first controller at the start-up of said optical communication system, and after performing said first measurement by said first controller, instructs said relay unit to perform said second measurement by said second controller in accordance with states of connection to said plurality of slave stations via said optical fiber network.

* * * * *